(12) United States Patent
Walker

(10) Patent No.: US 12,053,048 B2
(45) Date of Patent: *Aug. 6, 2024

(54) FOOTWEAR MIDSOLE WITH ELECTRORHEOLOGICAL FLUID HOUSING

(71) Applicant: NIKE, Inc., Beaverton, OR (US)

(72) Inventor: Steven H. Walker, Camas, WA (US)

(73) Assignee: NIKE, Inc., Beaverton, OR (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/391,092

(22) Filed: Aug. 2, 2021

(65) Prior Publication Data
US 2021/0353002 A1  Nov. 18, 2021

Related U.S. Application Data

(63) Continuation of application No. 16/119,123, filed on Aug. 31, 2018, now Pat. No. 11,103,027.

(60) Provisional application No. 62/572,284, filed on Oct. 13, 2017.

(51) Int. Cl.
| | | |
|---|---|---|
| *A43B 7/24* | (2006.01) | |
| *A43B 3/34* | (2022.01) | |
| *A43B 13/14* | (2006.01) | |
| *A43B 13/18* | (2006.01) | |
| *A43B 13/42* | (2006.01) | |
| *G01B 7/30* | (2006.01) | |

(52) U.S. Cl.
CPC .............. *A43B 13/189* (2013.01); *A43B 3/34* (2022.01); *A43B 7/24* (2013.01); *A43B 13/143* (2013.01); *A43B 13/186* (2013.01); *A43B 13/42* (2013.01); *G01B 7/30* (2013.01)

(58) Field of Classification Search
CPC ........... A43B 13/189; A43B 3/34; A43B 7/24; A43B 13/143; A43B 13/186; A43B 13/42; A43B 1/0054; A43B 13/206; A43B 3/005
See application file for complete search history.

(56) References Cited

U.S. PATENT DOCUMENTS

| | | | |
|---|---|---|---|
| 3,906,185 A | 9/1975 | Gross et al. | |
| 4,183,156 A | 1/1980 | Rudy | |
| 4,219,945 A | 9/1980 | Rudy | |
| 4,471,538 A | 9/1984 | Pomeranz et al. | |
| 4,651,443 A | 3/1987 | Eckstrom | |
| 4,674,816 A | 6/1987 | Frenznick et al. | |
| 4,898,084 A | 2/1990 | Oppermann et al. | |
| 4,923,057 A | 5/1990 | Carlson et al. | |

(Continued)

FOREIGN PATENT DOCUMENTS

| | | | |
|---|---|---|---|
| CN | 1153622 A | 7/1997 | |
| CN | 1185721 A | 6/1998 | |

(Continued)

OTHER PUBLICATIONS

Oct. 4, 2022—(EP) EESR—App. No. 22183270.1.

(Continued)

*Primary Examiner* — Jameson D Collier
(74) *Attorney, Agent, or Firm* — Banner & Witcoff, Ltd.

(57) ABSTRACT

A midsole may include an electrorheological (ER) fluid housing. The ER fluid housing may be located between top bottom surfaces of the midsole in at least a forefoot region of the midsole. The midsole may include a plate located over the ER fluid housing.

13 Claims, 23 Drawing Sheets

(56) References Cited

U.S. PATENT DOCUMENTS

| | | |
|---|---|---|
| 4,952,868 A | 8/1990 | Scherer, III |
| 4,999,931 A | 3/1991 | Vermeulen |
| 5,222,312 A | 6/1993 | Doyle |
| 5,335,382 A | 8/1994 | Huang |
| 5,343,639 A | 9/1994 | Kilgore et al. |
| 5,493,792 A | 2/1996 | Bates et al. |
| 5,686,167 A | 11/1997 | Rudy |
| 5,771,606 A | 6/1998 | Litchfield et al. |
| 5,794,366 A | 8/1998 | Chien |
| 5,813,142 A | 9/1998 | Demon |
| 5,896,682 A | 4/1999 | Lin |
| 5,921,009 A | 7/1999 | Hice |
| 5,979,086 A | 11/1999 | Vindriis |
| 6,058,341 A | 5/2000 | Myers et al. |
| 6,059,062 A | 5/2000 | Staelin et al. |
| 6,138,382 A | 10/2000 | Schoesler |
| 6,305,099 B1 | 10/2001 | Chu |
| 6,349,487 B1 | 2/2002 | Hice |
| 6,378,558 B1 | 4/2002 | Pohl et al. |
| 6,433,465 B1 | 8/2002 | McKnight et al. |
| 6,519,873 B1 | 2/2003 | Buttigieg |
| 6,740,125 B2 | 5/2004 | Mosler |
| 6,751,891 B2 | 6/2004 | Lombardino |
| 6,812,624 B1 | 11/2004 | Pei et al. |
| 6,845,573 B2 | 1/2005 | Litchfield et al. |
| 6,889,451 B2 | 5/2005 | Passke et al. |
| 6,971,193 B1 | 12/2005 | Potter et al. |
| 7,007,412 B2 | 3/2006 | Munster |
| 7,200,956 B1 | 4/2007 | Kotha et al. |
| 7,204,041 B1 | 4/2007 | Bailey, Sr. et al. |
| 7,219,449 B1 | 5/2007 | Hoffberg et al. |
| 7,254,908 B2 | 8/2007 | Ungari |
| 7,409,779 B2 | 8/2008 | Dojan et al. |
| 7,484,318 B2 | 2/2009 | Finkelstein |
| 7,950,169 B2 | 5/2011 | Holt et al. |
| 8,302,327 B2 | 11/2012 | Battlogg |
| 8,234,800 B2 | 12/2012 | Byster, Jr. et al. |
| 8,973,613 B2 | 3/2015 | Murphy et al. |
| 9,107,475 B2 | 8/2015 | Ellis |
| 9,271,538 B2 | 3/2016 | Ellis |
| 9,820,531 B2 | 11/2017 | Walker et al. |
| 9,885,083 B2 | 2/2018 | Conradson et al. |
| 10,980,312 B2 | 4/2021 | Walker et al. |
| 10,980,314 B2 | 4/2021 | Walker et al. |
| 11,103,027 B2 * | 8/2021 | Walker ............... G01B 7/30 |
| 2002/0133237 A1 | 9/2002 | Christesen |
| 2003/0056401 A1 | 3/2003 | Kwon |
| 2003/0101619 A1 | 6/2003 | Litchfield et al. |
| 2003/0101620 A1 | 6/2003 | Reed et al. |
| 2003/0120353 A1 | 6/2003 | Christensen |
| 2003/0154628 A1 | 8/2003 | Gyr |
| 2003/0212352 A1 | 11/2003 | Kahn |
| 2004/0002665 A1 | 1/2004 | Parihar et al. |
| 2004/0003515 A1 | 1/2004 | Marvin et al. |
| 2004/0040183 A1 | 3/2004 | Kerrigan |
| 2004/0154190 A1 | 8/2004 | Munster |
| 2004/0177531 A1 | 9/2004 | DiBenedetto et al. |
| 2004/0211085 A1 | 10/2004 | Passke et al. |
| 2005/0172515 A1 | 8/2005 | Ungari |
| 2005/0183292 A1 | 8/2005 | DiBenedetto et al. |
| 2005/0268487 A1 | 12/2005 | Ellis |
| 2006/0143645 A1 | 6/2006 | Vock et al. |
| 2006/0241783 A1 | 10/2006 | Christensen |
| 2006/0248749 A1 | 11/2006 | Ellis |
| 2006/0248750 A1 | 11/2006 | Rosenberg |
| 2006/0262120 A1 | 11/2006 | Rosenberg |
| 2007/0000154 A1 | 1/2007 | DiBenedetto et al. |
| 2007/0006489 A1 | 1/2007 | Case et al. |
| 2008/0016719 A1 | 1/2008 | Aveni et al. |
| 2008/0083140 A1 | 4/2008 | Ellis |
| 2008/0245985 A1 | 10/2008 | Heim et al. |
| 2008/0315872 A1 | 12/2008 | Kwun et al. |
| 2009/0200501 A1 | 8/2009 | Heim et al. |
| 2009/0235557 A1 | 9/2009 | Christensen et al. |
| 2009/0248760 A1 | 10/2009 | Tone et al. |
| 2009/0282704 A1 | 11/2009 | Park |
| 2010/0211355 A1 | 8/2010 | Horst et al. |
| 2010/0251565 A1 | 10/2010 | Litchfield et al. |
| 2010/0251574 A1 | 10/2010 | Battlogg et al. |
| 2011/0107622 A1 | 5/2011 | Schwirian |
| 2011/0251536 A1 | 10/2011 | Wilford et al. |
| 2012/0174432 A1* | 7/2012 | Peyton ............... A43B 13/188 36/31 |
| 2012/0233878 A1 | 9/2012 | Hazenberg et al. |
| 2012/0273053 A1 | 11/2012 | Murphy et al. |
| 2012/0291564 A1 | 11/2012 | Amos et al. |
| 2012/0324763 A1 | 12/2012 | Ellis, III |
| 2013/0019694 A1 | 1/2013 | Molyneux et al. |
| 2013/0033042 A1 | 2/2013 | Fortier et al. |
| 2013/0160329 A1 | 6/2013 | Peyton et al. |
| 2013/0185003 A1 | 7/2013 | Carbeck et al. |
| 2013/0213147 A1 | 8/2013 | Rice et al. |
| 2013/0278436 A1 | 10/2013 | Ellis |
| 2013/0291407 A1 | 11/2013 | Adair et al. |
| 2013/0333625 A1 | 12/2013 | Baxter et al. |
| 2014/0033572 A1 | 2/2014 | Steier et al. |
| 2014/0053427 A1 | 2/2014 | Patton |
| 2014/0059781 A1 | 3/2014 | Lafleche et al. |
| 2014/0068973 A1 | 3/2014 | Krupenkin et al. |
| 2014/0138020 A1 | 5/2014 | Williams |
| 2014/0250726 A1 | 9/2014 | Meschter |
| 2014/0277632 A1 | 9/2014 | Walker |
| 2015/0157091 A1 | 6/2015 | Hsu |
| 2015/0177081 A1 | 6/2015 | Steier |
| 2015/0297437 A1 | 10/2015 | Neuenhahn et al. |
| 2016/0044993 A1 | 2/2016 | Meschter et al. |
| 2016/0235160 A1 | 8/2016 | Lam et al. |
| 2016/0345663 A1 | 12/2016 | Walker et al. |
| 2016/0345669 A1 | 12/2016 | Orand et al. |
| 2016/0345670 A1 | 12/2016 | Orand |
| 2016/0367192 A1 | 12/2016 | Iyengar et al. |
| 2017/0071287 A1 | 3/2017 | Kim |
| 2017/0106940 A1 | 4/2017 | Paick |
| 2017/0150779 A1 | 6/2017 | Walker et al. |
| 2017/0150780 A1 | 6/2017 | Walker et al. |
| 2017/0150785 A1 | 6/2017 | Walker et al. |
| 2017/0348181 A1 | 12/2017 | Perriard et al. |
| 2018/0035752 A1 | 2/2018 | Walker et al. |
| 2018/0132566 A1 | 5/2018 | Rosenblatt et al. |
| 2019/0059511 A1 | 2/2019 | Walker et al. |
| 2019/0059514 A1 | 2/2019 | Walker et al. |
| 2019/0110551 A1 | 4/2019 | Walker |

FOREIGN PATENT DOCUMENTS

| | | |
|---|---|---|
| CN | 1372441 A | 10/2002 |
| CN | 1777370 A | 5/2006 |
| CN | 2930369 Y | 8/2007 |
| CN | 101675836 A | 3/2010 |
| CN | 101708087 A | 5/2010 |
| CN | 101766363 A | 7/2010 |
| CN | 101856161 A | 10/2010 |
| CN | 101978918 A | 2/2011 |
| CN | 201929109 U | 8/2011 |
| CN | 102341149 A | 2/2012 |
| CN | 102595949 A | 7/2012 |
| CN | 202286561 U | 7/2012 |
| CN | 103153107 A | 6/2013 |
| CN | 103250203 A | 8/2013 |
| CN | 103476285 A | 12/2013 |
| CN | 103776461 A | 5/2014 |
| CN | 104146850 A | 11/2014 |
| CN | 104270981 A | 1/2015 |
| CN | 104507342 A | 4/2015 |
| CN | 104507345 A | 4/2015 |
| CN | 104640467 A | 5/2015 |
| CN | 204580030 U | 8/2015 |
| CN | 105231582 A | 1/2016 |
| CN | 105266256 A | 1/2016 |
| CN | 105631195 A | 6/2016 |
| CN | 105815866 A | 8/2016 |
| CN | 205568003 U | 9/2016 |
| CN | 106063607 A | 11/2016 |
| CN | 106136419 A | 11/2016 |

(56) References Cited

FOREIGN PATENT DOCUMENTS

| | | |
|---|---|---|
| CN | 206025343 U | 3/2017 |
| CN | 106595912 A | 4/2017 |
| CN | 106858891 A | 6/2017 |
| CN | 107003188 A | 8/2017 |
| DE | 10240530 A1 | 3/2004 |
| EP | 0211283 A1 | 2/1987 |
| EP | 1210883 A1 | 6/2002 |
| EP | 2774502 A1 | 9/2014 |
| FR | 2973656 A1 | 10/2012 |
| JP | H05-267035 A | 10/1993 |
| JP | H11117985 A | 4/1999 |
| JP | 200015646 A | 1/2000 |
| JP | 2002538866 A | 11/2002 |
| JP | 2003530913 A | 10/2003 |
| JP | 2004529667 A | 9/2004 |
| JP | 2005279281 A | 10/2005 |
| JP | 2009540237 A | 11/2009 |
| JP | 2013215530 A | 10/2013 |
| JP | 2014505575 A | 3/2014 |
| KR | 20130048669 A | 5/2013 |
| KR | 20130068881 A | 6/2013 |
| KR | 20140109647 A | 9/2014 |
| KR | 20180003633 A | 1/2018 |
| TW | 453151 U | 9/2001 |
| WO | 93012685 A1 | 7/1993 |
| WO | 9835529 A2 | 8/1998 |
| WO | 0178539 A2 | 10/2001 |
| WO | 2007125148 A1 | 11/2007 |
| WO | 2008156860 A1 | 12/2008 |
| WO | 2009152456 A2 | 12/2009 |
| WO | 2012112931 A2 | 8/2012 |
| WO | 2014138020 A1 | 9/2014 |
| WO | 2016075599 A1 | 5/2016 |
| WO | 2016191204 A1 | 12/2016 |
| WO | 2017095850 A1 | 6/2017 |

OTHER PUBLICATIONS

Oct. 15, 2021—(EP) ESR—App. No. 21182913.0.
Demon, Ronald, "Black History in America" Internet Archive Wayback Machine, http://www.myblackhistor.net/Ronald_Demon.htm, pp. 1-2.
Sep. 19, 2016—(WO) ISR & WO—App. No. PCT/US16/033899.
Feb. 17, 2017—(WO) ISR & WO—App. No. PCT/US16/064068.
Vieroth, et al., Stretchable Circuit Board Technology and Application, Wearable Computers, 2009 ISWC '09, International Symposium. Sep. 7, 2009 (Sep. 7, 2009), pp. 33-36, XP055351553, Piscataway, NJ, USA, DOI: 10.1109/ISWC.2009.13, ISBN: 978-0-7695-3779-5, sentences 3-5, 20-21, paragraph 2.2.
Mar. 15, 2017—(WO) ISR & WO—App. No. PCT/US16/064084.
Nov. 6, 2018—(WO) ISR & WO—App. No. PCT/US18/048719.
Dec. 6, 2018—(WO) ISR & WO—App. No. PCT/US18/048708.
Dec. 21, 2018—(EP) Supp. ESR—App. No. 16804005.3.
Mar. 6, 2019—(WO) ISR & WO—App. No. PCT/US18/048729.

\* cited by examiner

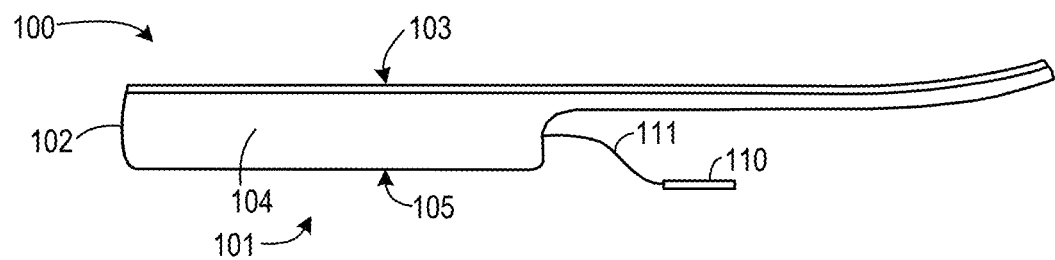
FIG. 3A
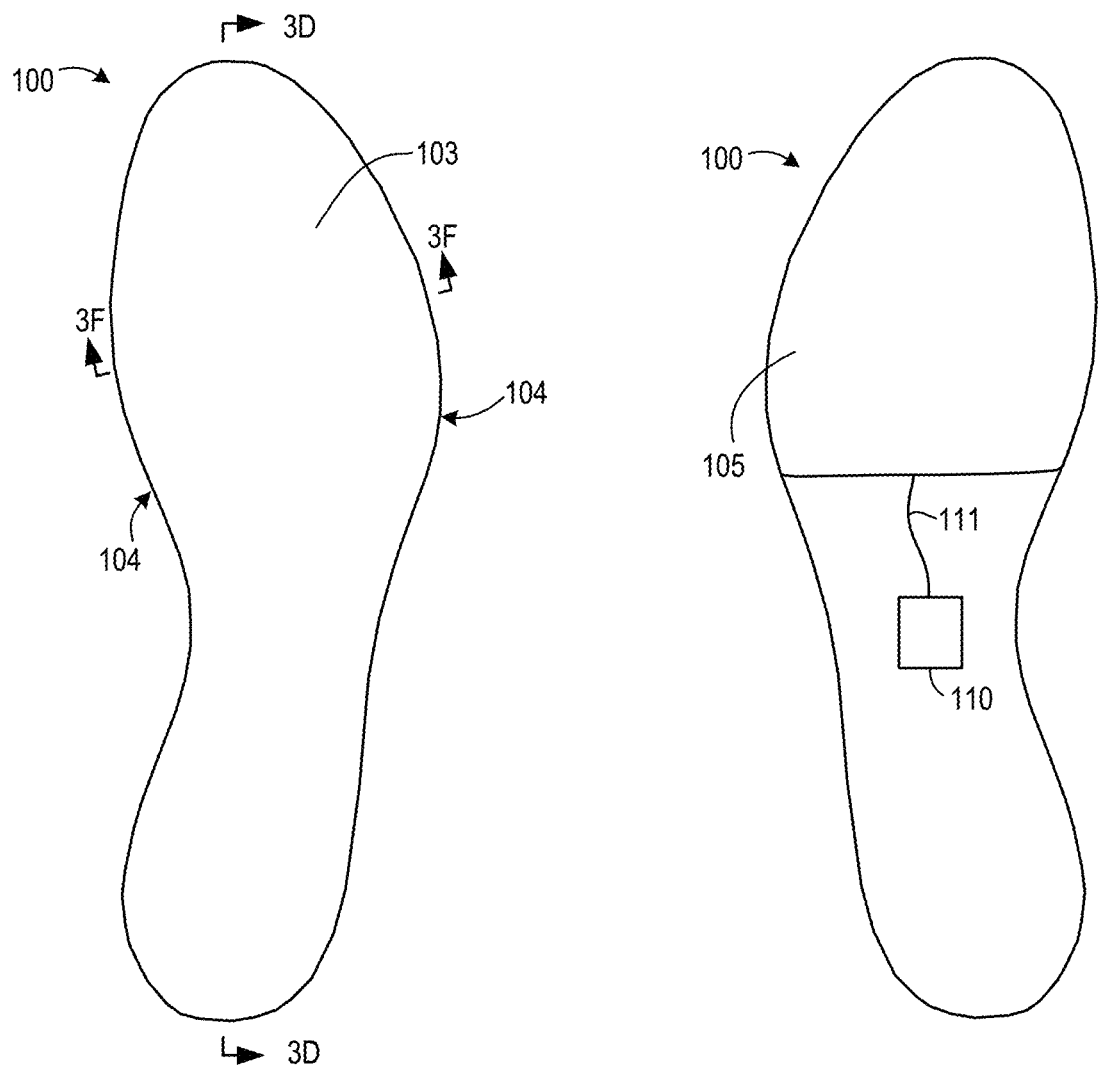
FIG. 3B
FIG. 3C

FOOTWEAR MIDSOLE WITH ELECTRORHEOLOGICAL FLUID HOUSING

CROSS REFERENCE TO RELATED APPLICATION

This application is a continuation of and claims priority to U.S. patent application Ser. No. 16/119,123, filed Aug. 31, 2018, which claims priority to U.S. provisional patent application No. 62/572,284, titled "FOOTWEAR MIDSOLE WITH ELECTRORHEOLOGICAL FLUID HOUSING" and filed Oct. 13, 2017, all of the above applications, in their entireties, are incorporated by reference herein.

BACKGROUND

Electrorheological (ER) fluids typically comprise a non-conducting oil or other fluid in which very small particles are suspended. In some types of ER fluid, the particles may have diameters of 5 microns or less and may be formed from polystyrene or another polymer having a dipolar molecule. When an electric field is imposed across an ER fluid, the viscosity of the fluid increases as the strength of that field increases. This characteristic of ER fluids can be used to control flow in a system containing an ER fluid.

SUMMARY

This Summary is provided to introduce a selection of concepts in a simplified form that are further described below in the Detailed Description. This Summary is not intended to identify key features or essential features of the invention.

In some embodiments, a midsole may comprise an ER fluid housing. The ER fluid housing may be located between top bottom surfaces of the midsole in at least a forefoot region of the midsole. The midsole may also comprise a plate located over the ER fluid housing.

A midsole according to any of various embodiments may be incorporated into an article of footwear. Incorporating a midsole into an article of footwear may comprise combining the midsole with an upper and with an additional sole structure.

Additional embodiments are described herein.

BRIEF DESCRIPTION OF THE DRAWINGS

Some embodiments are illustrated by way of example, and not by way of limitation, in the figures of the accompanying drawings and in which like reference numerals refer to similar elements.

FIG. 3A is a medial side view of a midsole that incorporates an ER fluid housing of the type shown in FIGS. 1A-1D.

FIGS. 3B and 3C are respective top and bottom views of the midsole of FIG. 3A.

DETAILED DESCRIPTION

Figure 1A:
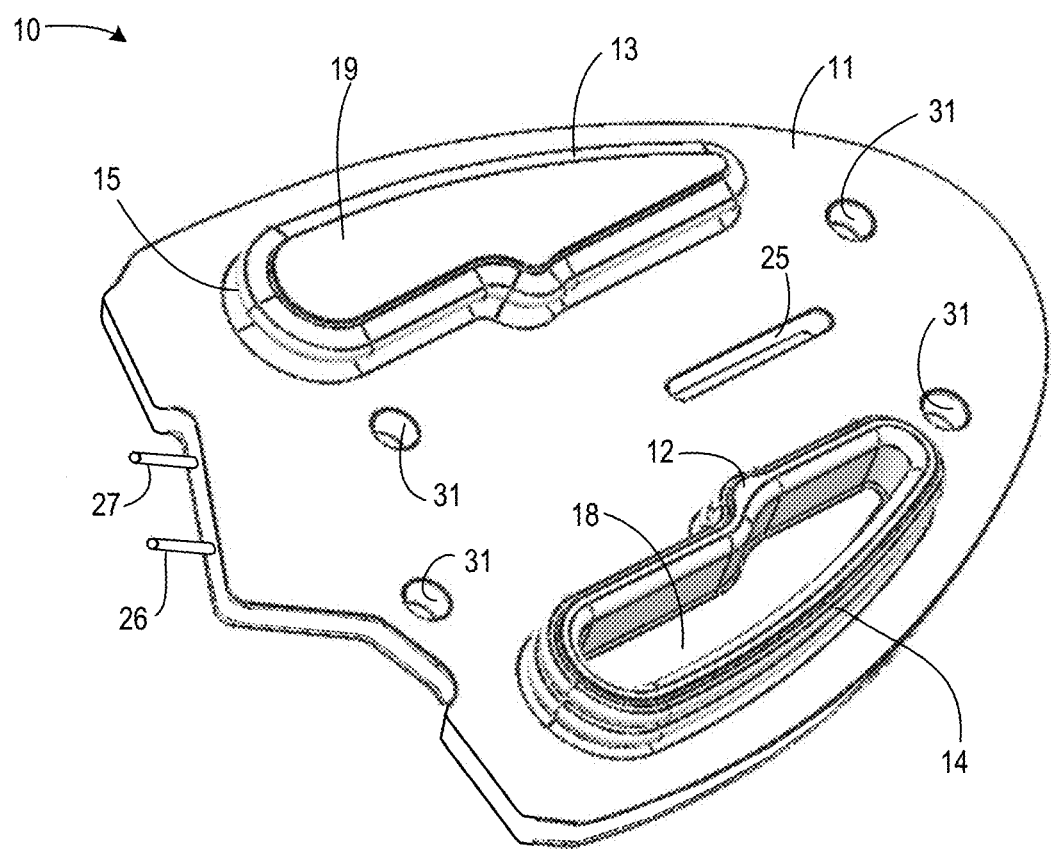
FIG. 1A is rear lateral top perspective view of one type of ER fluid housing.

Throughout the following description and in the drawings, similar elements are sometimes identified using a common numerical designator and different appended letters (e.g., chambers 52a through 52c of FIG. 2). Elements identified in such a manner may also be identified collectively (e.g., chambers 52) or generically (e.g., a chamber 52) using the numerical designator without an appended letter.

FIG. 1A is rear lateral top perspective view of an ER fluid housing 10. Housing 10 includes a main body 11 and two fluid chambers 12 and 13. Chambers 12 and 13 are bounded by flexible contoured walls 14 and 15, respectively, that extend upward from a top side of main body 11. As explained in more detail below, a channel within main body 11 connects chambers 12 and 13. Chambers 12 and 13 and the connecting channel may be filled with ER fluid using sprues, not shown, that are sealed after filling and degassing.

Housing 10 may be incorporated into a sole structure and chambers 12 and 13 placed under a support plate. Chambers 12 and 13 are configured to change outward extension from main body 11 in correspondence to change in volume of the ER fluid within the chambers. In particular, ER fluid may be allowed to flow between chambers 12 and 13 when it is desired to adjust a shape of the sole structure. Flow from chamber 13 to chamber 12 may decrease a height of a central region 19 of chamber 13 relative to main body 11 and simultaneously increase a height of a central region 18 of chamber 12. Flow in the opposite direction will have the opposite effect. When central portions 18 and 19 achieve desired heights, further height change can be stopped by energizing electrodes in the connecting channel. Energizing those electrodes increases viscosity of ER fluid in that channel and prevents further flow of ER fluid between chambers 12 and 13. An elongated opening 25 and round openings 31 extend all the way through main body 11.

Figure 1B:
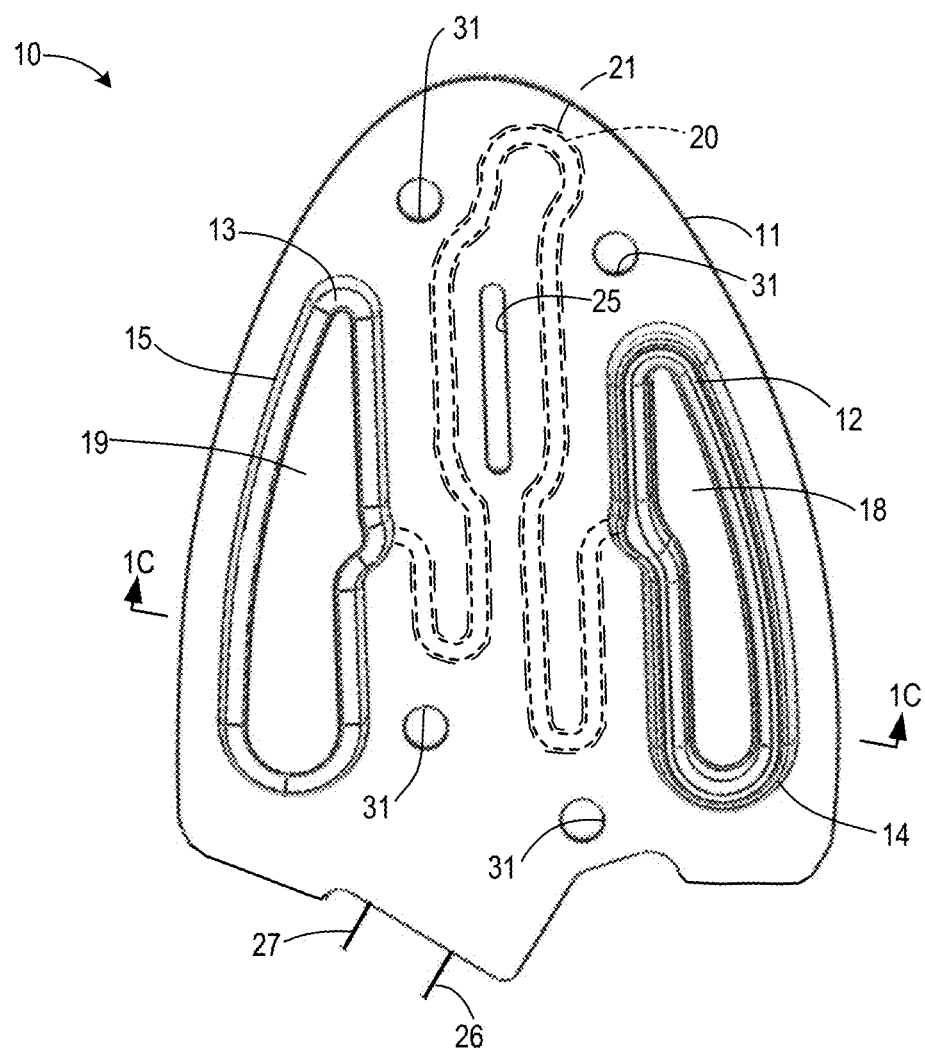
FIG. 1B is a top view of the ER fluid housing of FIG. 1A.
Figure 1C:
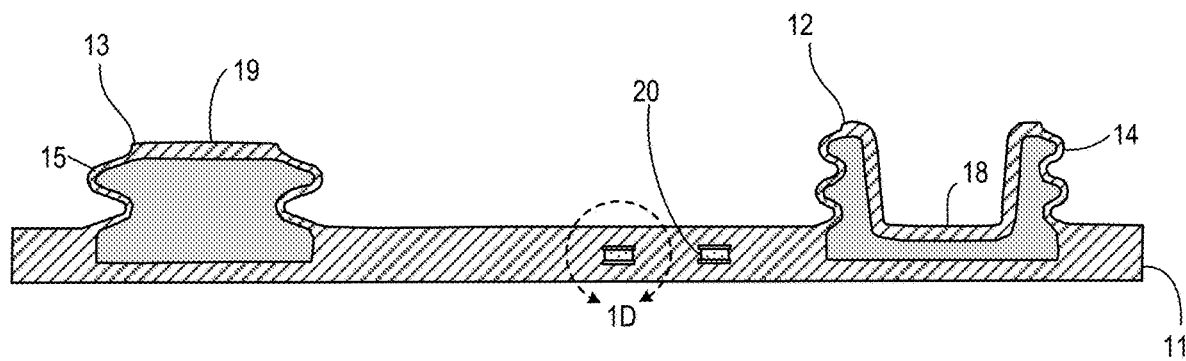
FIG. 1C is a partially schematic area cross-sectional view taken from the plane indicated in FIG. 1B.
Figure 1D:
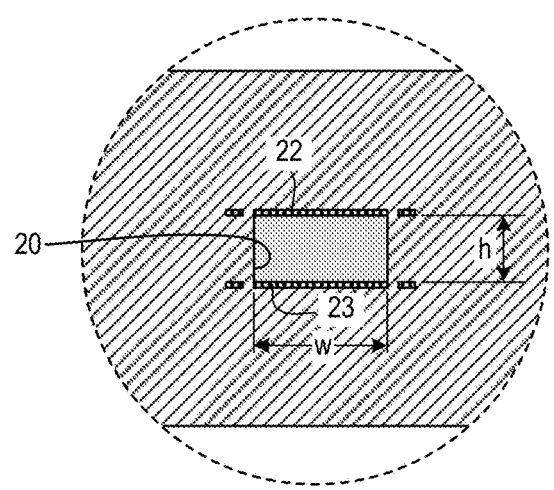
FIG. 1D is an enlarged portion of the view of FIG. 1C.

FIG. 1B is a top view of housing 10. The location of channel 20 that connects chambers 12 and 13 is indicated with small broken lines. A pair of opposing electrodes are positioned within channel 20 on bottom and top sides and extend along a portion 21 indicated in FIG. 1B with large broken lines. Each of electrical leads 26 and 27 is connected to one of those electrodes. FIG. 1C is a partially schematic area cross-sectional view, taken along the plane indicated in FIG. 1B, showing housing 10 after filling with ER fluid. Gray shading is used in FIGS. 1C and 1*n* other figures to indicate regions that contain ER fluid. As seen in FIG. 1C, chambers 12 and 13 have bellows shapes created by folds in walls 14 and 15. FIG. 1D is an enlargement of the region indicated in FIG. 1C. FIG. 1D shows additional details of channel 20 and of electrodes 22 and 23 respectively covering the top and bottom walls of channel 20 along portion 21. In some examples, channel 20 may have a maximum height h between electrodes of 1 millimeter (mm), an average width (w) of 2 mm, and a length along a flow path between chamber 12 and 13 of at least 200 mm.

Exemplary material for housing 10 and chambers 12 and 13 includes thermoplastic polyurethane (TPU). Exemplary material for electrodes 22 and 23 includes 0.05 mm thick, 1010 nickel plated, cooled rolled steel. Additional details of housing 10 and of other types of similar housings can be found in U.S. provisional patent application No. 62/552,548 (filed Aug. 31, 2017, and titled "Footwear Including an Incline Adjuster"), which application, in its entirety, is incorporated by reference herein.

Figure 2A:
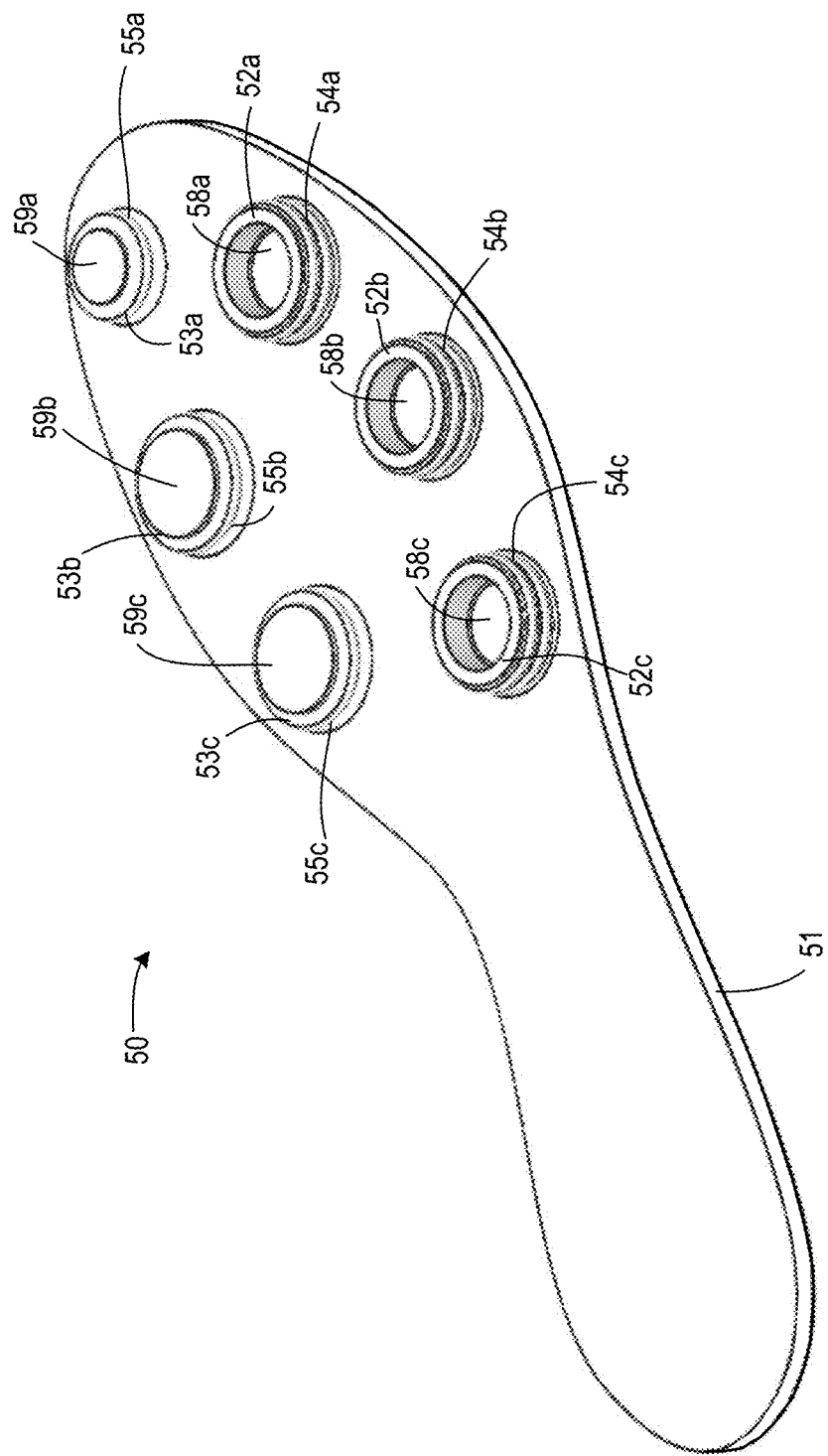
FIG. 2A is a lateral top perspective view of another type of ER fluid housing.
Figure 2B:
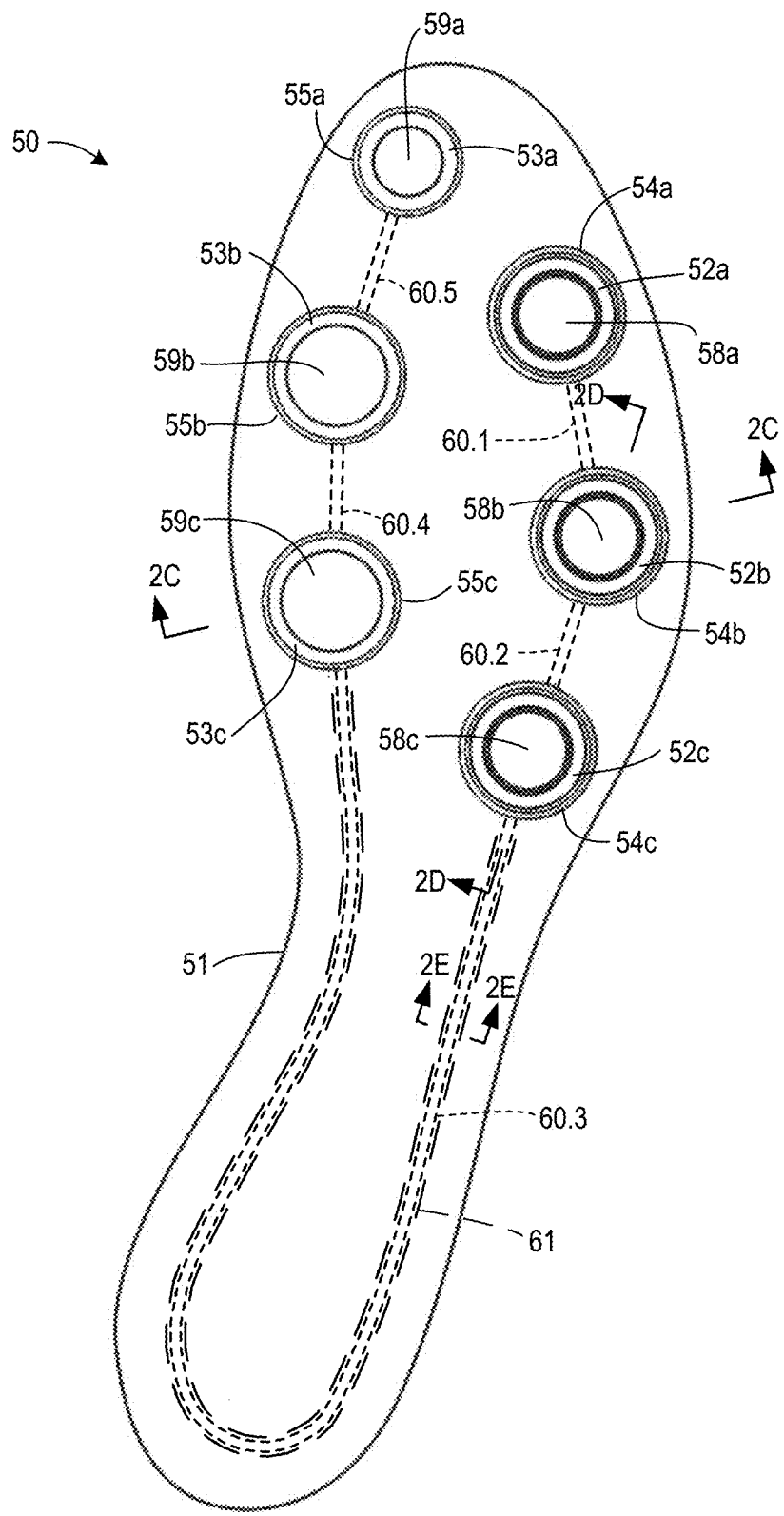
FIG. 2B is a top view of the ER fluid housing of FIG. 2A.

FIG. 2A is a lateral top perspective view of an ER fluid housing 50. FIG. 2B is a top view of housing 50. Housing 50 includes a main body 51 and six fluid chambers. Chambers 52*a* through 52*c* are located on one side of housing 50, and chambers 53*a* through 53*c* are located on an opposite side. Chambers 52*a* through 52*c* and 53*a* through 53*c* are bounded by flexible contoured walls 54*a* through 54*c* and 55*a* through 55*c*, respectively, that extend upward from a top side of main body 51. Chambers 52*a* through 52*c* and 53*a* through 53*c* are connected by channels 60.1 through 60.5, which channels are located in main body 51 and are indicated in FIG. 2B with small broken lines. Opposing electrodes are positioned within channel 60.3 on bottom and top sides and extend along a portion 61 indicated in FIG. 2B with large broken lines. Chambers 52*a* through 52*c*, chambers 53*a* through 53*c*, and channels 60.1 through 60.5 may be filled with ER fluid using sprues, not shown, that may be sealed after filling.

Housing 50 may also be used as a component of an article of footwear. In particular, housing 50 may be incorporated into a sole structure and chambers 52*a* through 52*c* and 53*a* through 53*c* placed under a support plate. Chambers 52*a* through 52*c* and 53*a* through 53*c* are configured to change outward extension from main body 51 in correspondence to change in volume of the ER fluid within the chambers. In particular, ER fluid may be allowed to flow from chambers on one side (e.g., chambers 53*a* through 53*c*) to chambers on the other side (e.g., chambers 52*a* through 52*c*) to adjust a shape of the sole structure. Flow from chambers 53*a* through 53*c* to chambers 52*a* through 52*c* may decrease heights of central regions 59*a* through 59*c* of chambers 53*a* through 53*c*, respectively, relative to main body 51 and simultaneously increase heights of central regions 58*a* through 58*c* of chambers 52*a* through 52*c*, respectively. Flow in the opposite direction will have the opposite effect. Height change can be stopped by energizing electrodes in channel 60.3 to prevent further flow of ER fluid.

Figure 2C:
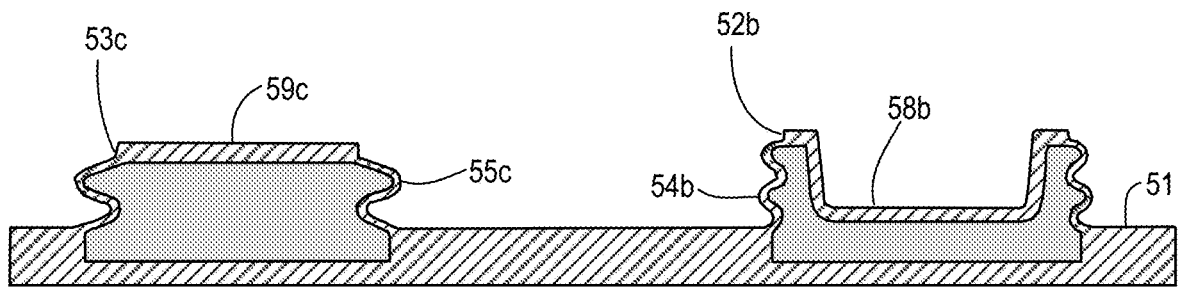
FIGS. 2C through 2E are partially schematic area cross-sectional views taken from the planes indicated in FIG. 2B.
Figure 2D:
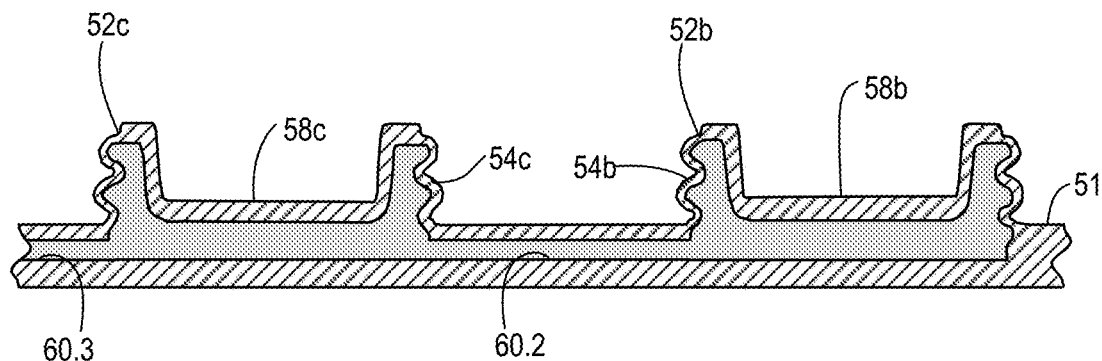
Figure 2E:
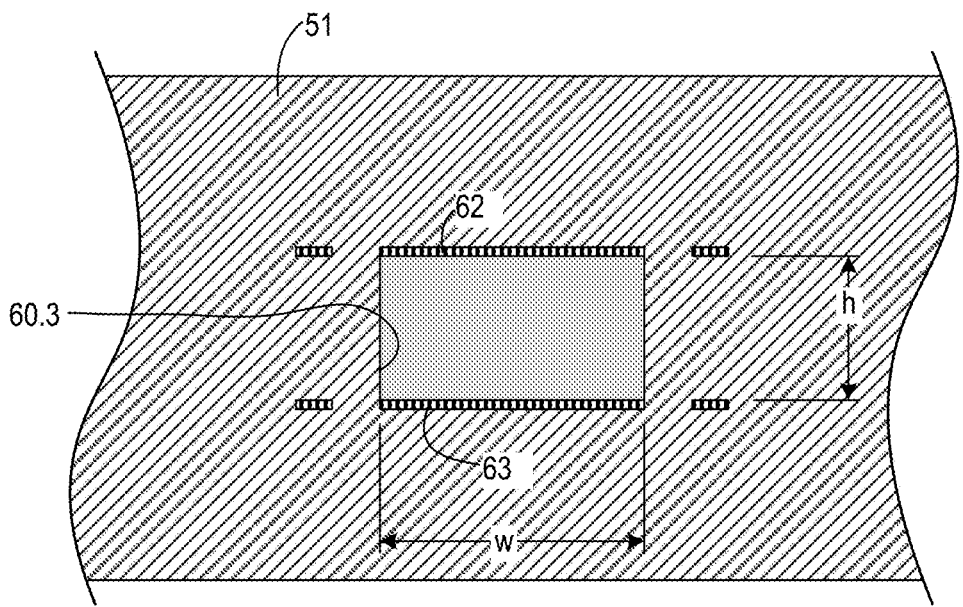

FIGS. 2C through 2E are partially schematic area cross-sectional views, taken from the planes indicated in FIG. 2B, showing housing 50 after filling with ER fluid. FIG. 2E is enlarged relative to FIGS. 2C and 2D. The structure of chambers 53*a* and 53*b* is similar to that of chamber 53*c*, although chamber 53*a* is of slightly smaller diameter. The structure of chamber 52*a* is similar to that of chambers 52*b* and 52*c*. The structure of channels 60.1, 60.4, and 60.5 is similar to that of channels 60.2 and 60.3, although channels 60.1, 60.2, 60.4, and 60.5 lack electrodes. As seen in FIGS. 2C and 2D, chambers 52*a* through 52*c* and 53*a* through 53*c* have bellows shapes created by folds in walls 54*a* through 54*c* and 55*a* through 55*c*. FIG. 2E shows additional details of channel 60.3 and of electrodes 62 and 63 respectively covering the top and bottom walls of channel 60.3 along portion 61. In some examples, channel 60.3 may have a maximum height h between electrodes of 1 mm, an average width w of 2 mm, and a length along a flow path between chambers 52*c* and 53*c* of at least 270 mm. The maximum height h (between top and bottom walls) and average width w of channels 60.1, 60.2, 60.4, and 60.5 may have the same dimensions as the maximum height and average width, respectively, of channel 60.3.

Exemplary material for housing 50 and chambers 52*a* through 52*c* and 53*a* through 53*c* includes TPU. Exemplary material for electrodes 62 and 63 includes 0.05 mm thick, 1010 nickel plated, cooled rolled steel. Additional details of housing 50 and of other types of similar housings can be found in U.S. provisional patent application No. 62/552,551 (filed Aug. 31, 2017, and titled "Incline Adjuster With Multiple Discrete Chambers"), which application, in its entirety, is incorporated by reference herein.

One example of ER fluid that may be used in housing 10 or in housing 50 is sold under the name "RheOil 4.0" by ERF Produktion Würzberg GmbH. Housings 10 and 50 may be filled and degassed using operations such as those described in U.S. provisional patent application No. 62/552, 555 (filed Aug. 31, 2017, and titled "Degassing Electrorheological Fluid"), which application, in its entirety, is incorporated by reference herein.

As indicated above, ER fluid housings such as housing 10 and housing 50 may be incorporated into articles of footwear and used to control shapes of footwear sole structures. Fabricating ER housings requires equipment and skills that may not normally be available in facilities that manufacture conventional footwear. Incorporating an ER fluid housing into a sole structure may also require skills that are not normally needed when fabricating conventional footwear. Moreover, ER fluid housings may require special handling to avoid damage. For example, excessive bending force on an ER fluid housing main body might damage electrodes. As another example, improper handling may result in a torn chamber wall and leakage of ER fluid. These and other types of damage could render an ER fluid housing inoperable.

For these and other reasons, it would be advantageous to enclose an ER fluid housing in a protective structure prior to providing that ER fluid housing to a footwear factory. It would also be advantageous if that structure had a size and shape similar to conventional footwear components and could be incorporated into a shoe using techniques similar to techniques used with conventional components. For these and other reasons, an ER fluid housing may be incorporated into a midsole. That midsole may then be provided to a footwear factory and incorporated into a shoe using conventional shoe assembly techniques. The midsole and other components within that midsole may protect the ER fluid housing from damage.

FIG. 3A is a medial side view of a midsole 100. Midsole 100 is a midsole for a right foot shoe of a pair that includes a left foot shoe. A midsole for the left foot shoe of that pair may be a mirror image of midsole 100. As explained in more detail below, midsole 100 includes an ER fluid housing 10 located in a forefoot region 101. FIGS. 3B and 3C are respective top and bottom views of midsole 100. Midsole 100 comprises a midsole shell 102. Shell 102 comprises a top surface 103, a bottom surface 105, and a side surface 104 extending between top surface 103 and bottom surface 105. As seen in FIGS. 3B and 3C, side surface 104 has a shape corresponding to shape of a footwear sole structure in a plantar plane. After midsole 100 has been incorporated into a shoe having an upper and a ground contacting surface, top surface 103 will face toward an interior region of the upper that is configured to receive a wearer foot, and bottom surface 105 will face toward the ground contacting surface. A controller 110 is connected to the ER fluid housing within midsole 100 by a wiring harness 111. As explained in more detail below, controller 110 contains electronics that may be used to control voltage applied to electrodes of the ER fluid housing. When incorporated into a shoe, controller 110 may be placed in an additional sole structure of the shoe.

Figure 3D:
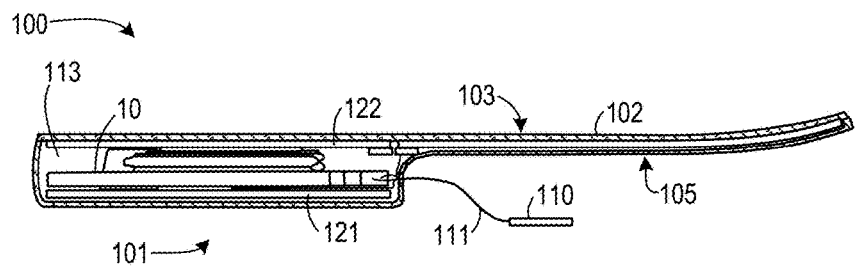
FIG. 3D is a partially cross-sectional medial side view of the midsole of FIG. 3A.
Figure 3E:
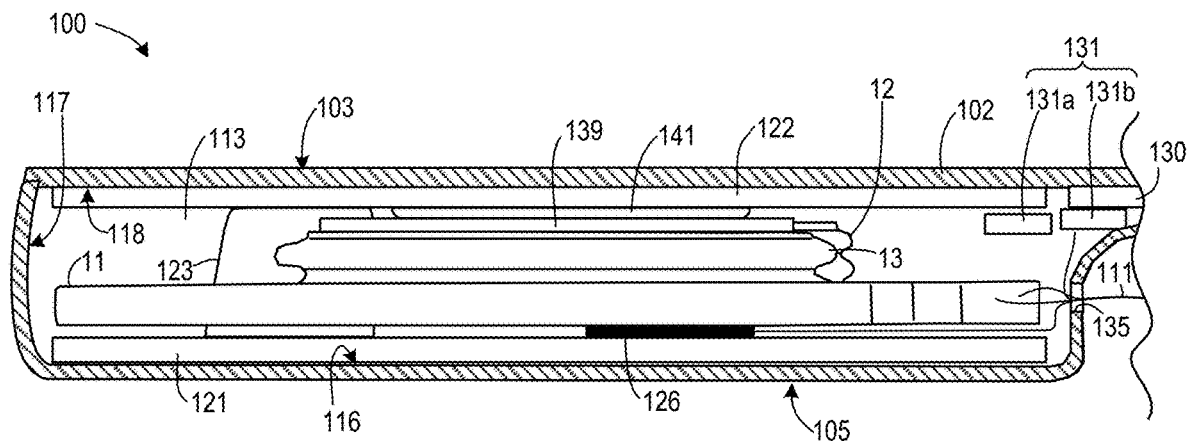
FIG. 3E is an enlargement of a portion of FIG. 3D.
Figure 3F:
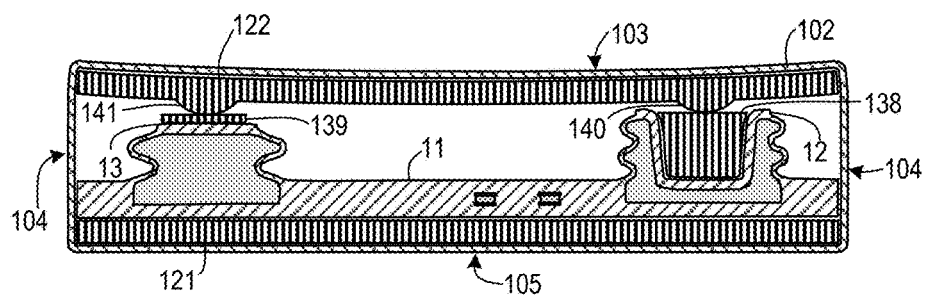
FIG. 3F is an area cross-sectional view of the midsole of FIG. 3A.

FIG. 3D is a partially cross-sectional medial side view of midsole 100. In FIG. 3D, shell 102 is shown in cross-section from the plane indicated in FIG. 3B, but other components of midsole 100 are not shown in cross-section. In other words, FIG. 3D is similar to a side view of midsole 100 with a medial side of shell 102 peeled away. FIG. 3E is an enlargement of a portion of FIG. 3D that includes forefoot region 101. FIG. 3F is an enlarged area cross-sectional view taken from the plane indicated in FIG. 3B.

ER fluid housing 10 is contained within shell 102 above a portion of bottom surface 105 and below a portion of top surface 103, and is surrounded by a portion of side surface 104. Shell 102 comprises an internal cavity 113. A base of shell 102 has an exterior surface that forms bottom surface 105 and an interior surface 116 that forms a bottom boundary of cavity 113. A rim of shell 102 has an exterior surface that forms side surface 104 and an interior surface 117 that forms a side wall of cavity 113. A cover of shell 102 has an exterior surface that forms top surface 103 and an interior surface 118 that forms a top boundary of cavity 113.

Also located within cavity 113 are bottom forefoot plate 121 and top forefoot plate 122. Plate 121, which may be formed from a relatively stiff polymer or polymer composite, helps to stiffen the forefoot region of midsole 100 and provide a stable base for ER fluid housing 10. Plate 122 is generally aligned with plate 121 and may also be formed from a relatively stiff polymer or polymer composite. Fulcrum element 123 may be formed from hard rubber or from one or more other materials that are generally incompressible under loads that result when a wearer of a shoe incorporating midsole 100 runs. Fulcrum element 123 is attached a top surface of bottom forefoot plate 121 and extends upward, through elongated opening 25, to contact the underside of top forefoot plate 122. Top forefoot plate 122 provides a stable and relatively non-deformable region that is supported by chambers 12 and 13 and by fulcrum element 123. Two force sensing resistors (FSRs) 126 and 127 are positioned between main body 11 and the top surface of plate 121. FSR 126, which is visible in FIG. 3E, is positioned under chamber 13. FSR 127, which is not visible in FIG. 3E but is shown in a subsequent figure, is located under chamber 12.

Midsole 100 also includes a rear plate 130 which extends rearward of top forefoot plate 122. Rear plate 130 extends to a heel region of midsole 100. When midsole 100 is used after incorporation into a shoe, and as described in more detail below, top forefoot plate 122 rotates relative to rear plate 130 as ER fluid is transferred between chambers 12 and 13. A magnetic rotational sensor 131 includes a front portion 131a secured to top forefoot plate 122 and a rear portion 131b secured to rear plate 130. A signal output from sensor 131 is indicative of a magnitude of relative rotational angle between plates 122 and 130. As discussed in more detail below, signals from sensor 131 are received and used by controller 110 to determine voltages to set across electrodes 22 and 23 in ER fluid housing 10. Wiring harness 111 includes wires connected to the rear portion 131b of sensor 131, to FSRs 126 and 127, and to leads 26 and 27 emanating from main body 11. Wiring harness 111 extends from cavity 113 to the exterior of midsole 100 through an opening 135 in shell 102.

As seen in as seen in FIG. 3F, support caps 138 and 139 may be placed onto central regions of chambers 12 and 13, respectively. Examples of materials from which support caps 138 and 139 may be formed include, without limitation, polycarbonate (PC), a blend of PC and acrylonitrile butadiene styrene (ABS), or acetal homopolymer. The underside of top forefoot plate 122 may include rounded projections 140 and 141 that bear against top surfaces of support caps 138 and 139.

Examples of materials from which shell 102 may be formed include, without limitation, a flexible thermoplastic polyurethane or other flexible and elastic polymer. A main portion of shell 102 that comprises the bottom and rim may be molded as one piece, and the cover of shell 102 molded as a separate piece. After all components have been placed into the main portion of shell 102, the cover of shell 102 may be bonded to an upper edge of the main portion using RF welding, chemical adhesive, or other process.

Figure 4C:
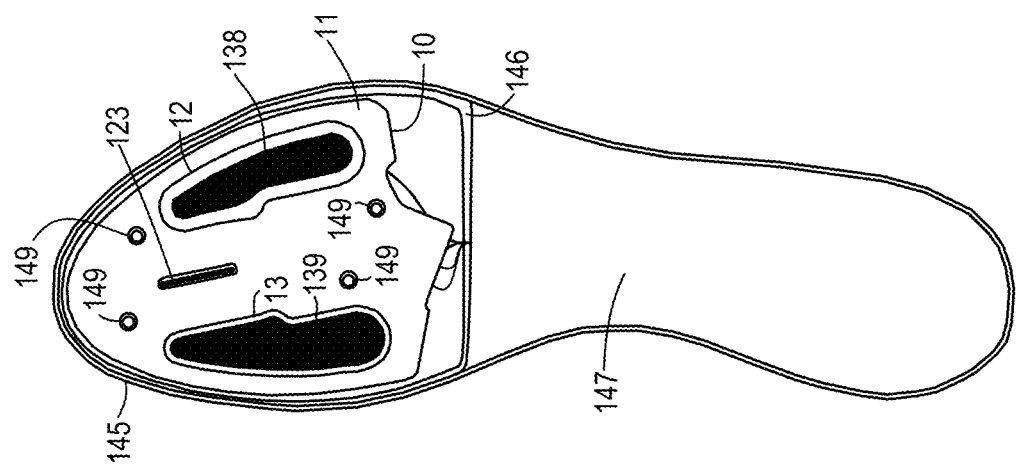
FIGS. 4A through 4F show assembly of the midsole of FIG. 3A.
Figure 4B:
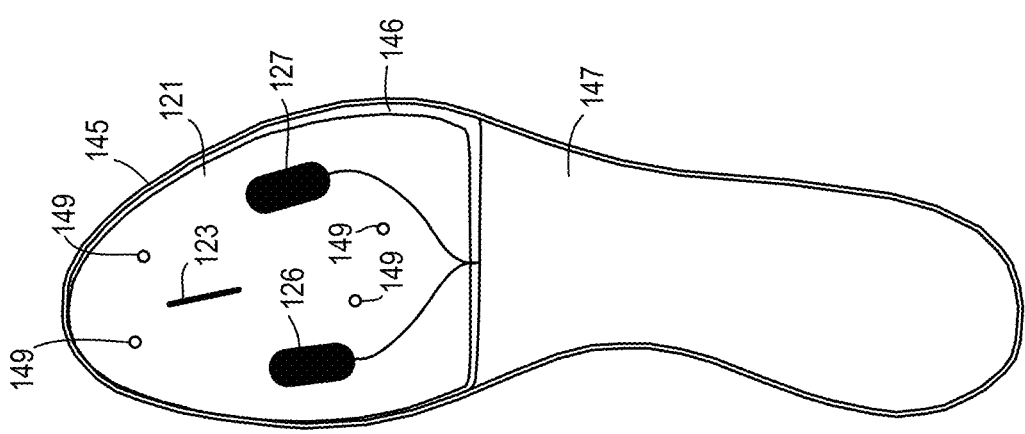
Figure 4A:
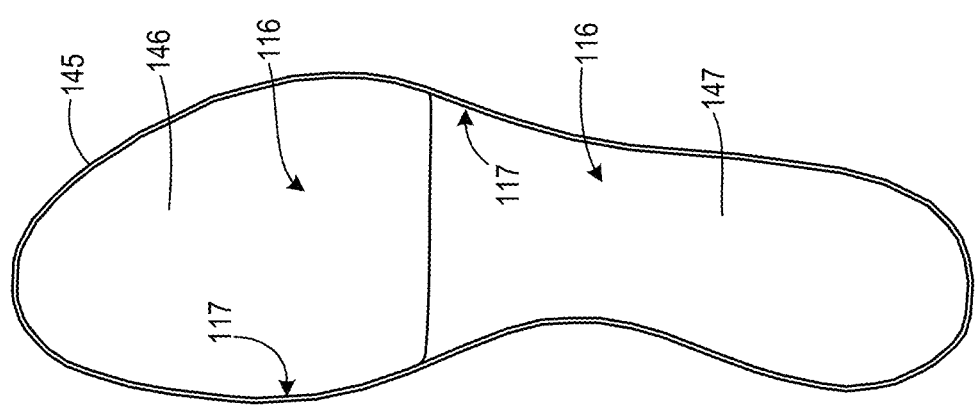

FIGS. 4A through 4F show assembly of midsole 100. FIG. 4A is a top view of a main portion 145 of shell 102. Interior surface 116 of the shell 102 bottom, and interior surface 117 of the shell 102 rim, define a forefoot pocket 146 and a midfoot/heel pocket 147 in main portion 145. Interior surfaces 116 and 117 will also define bottom and side boundaries of cavity 113 in an assembled midsole 100.

In FIG. 4B, bottom forefoot plate 121 has been placed in pocket 146. Bottom side of plate 121 may be adhesively bonded to a portion of interior surface 116 within pocket 146. FSRs 126 and 127 and fulcrum element 123 have been glued into place on the top side of plate 121. Wires from FSRs 126 and 127 have been routed through opening 135.

In FIG. 4C, ER fluid housing 10 has been put into place over top forefoot plate 121 and FSRs 126 and 127. Round projections 149 on the top of plate 121 fit within corresponding round openings 31. Portions of the bottom of main body 11 may be adhesively bonded to portions of the top of plate 121. Wires attached to leads 26 and 27 are routed through opening 135. Support cap 138 and support cap 139 are put onto central regions of chambers 12 and 13. Support caps 138 and 139 may be at least partially secured to chamber 12 and 13 using adhesive.

Figure 4F:
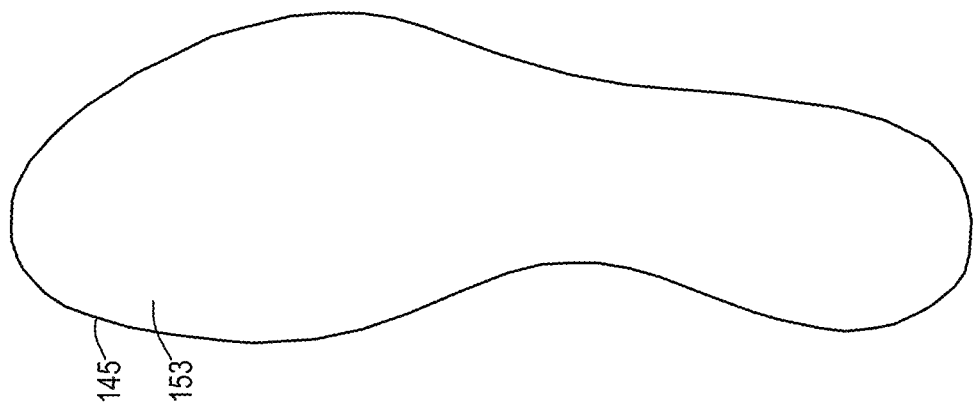
Figure 4E:
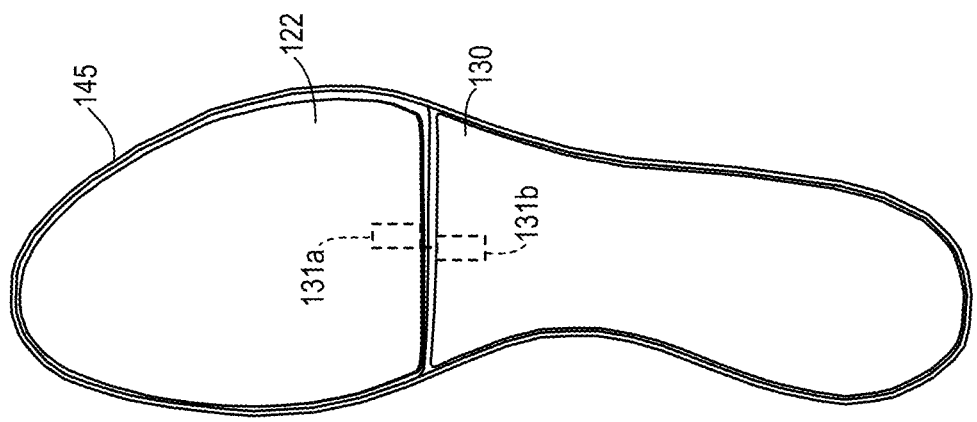
Figure 4D:
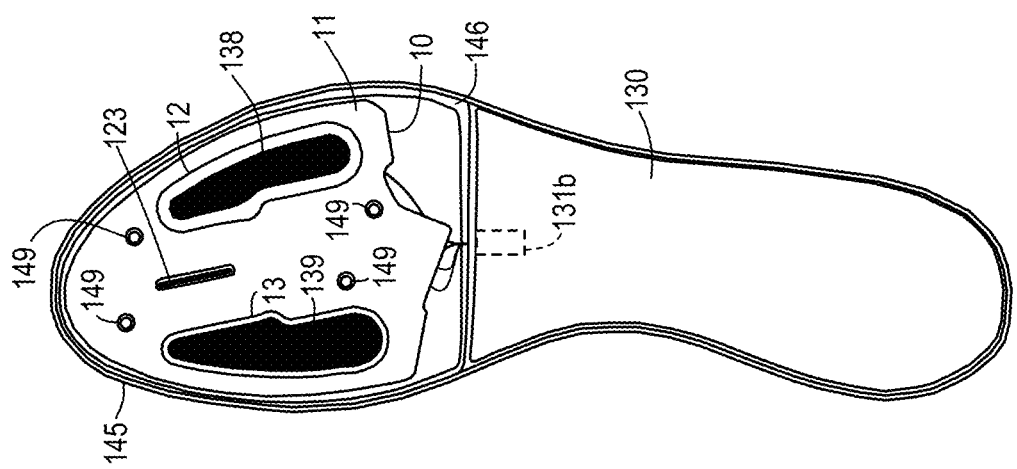

In FIG. 4D, rear plate 130 is put into place in pocket 147. At least a portion of a bottom of rear plate 130 may be adhesively bonded to a portion of interior surface 116 located in pocket 147. A wire from magnetic sensor component 131b is routed through opening 135.

In FIG. 4E, top forefoot plate 122 has been put into place over ER fluid housing 10 and support caps 138 and 139.

In FIG. 4F, a cover 153 is placed of top forefoot plate 122 and rear plate 130. At least portions of the top of plate 122 and/or at least portions of the top of plate 130 may be adhesively bonded to the bottom of cover 153. The periphery of cover 153 is bonded to an upper edge of main portion 145 at or near a top of the shell 102 rim. Wires passed through opening 135 during assembly may be connected to controller 110 and bundled into harness 111.

Figure 5A:
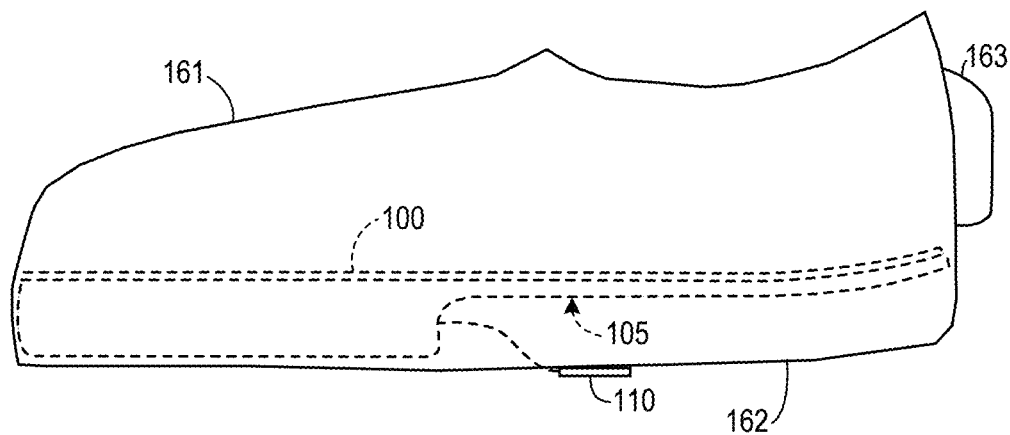
FIGS. 5A through 5C show one example of a method by which the midsole of FIG. 3A may be incorporated into an article of footwear.
Figure 5B:
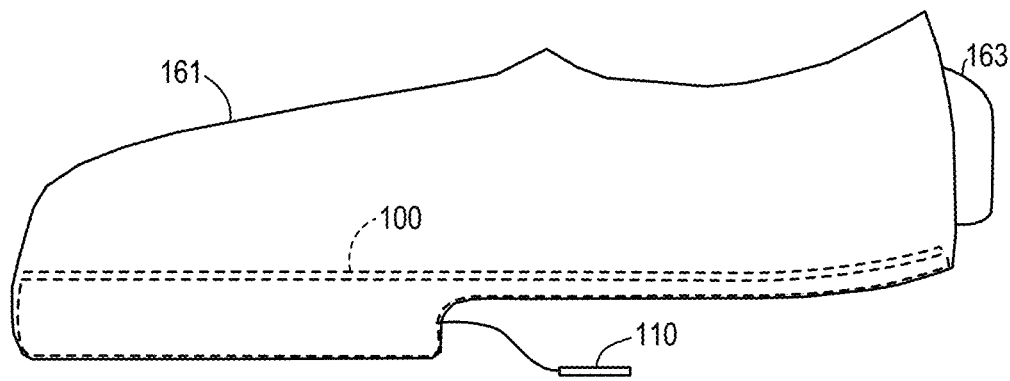
Figure 5C:
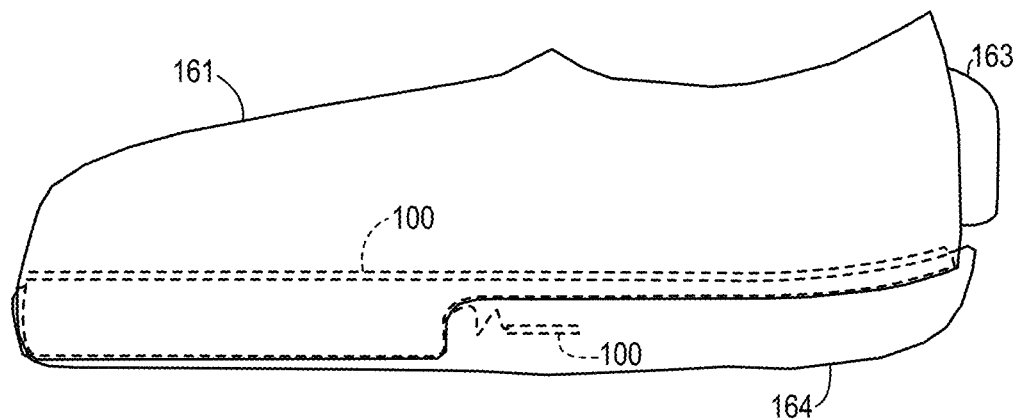

FIGS. 5A through 5C show one example of a method by which midsole 100 may be incorporated into a shoe. In FIG. 5A an upper 161 is placed onto a last, not shown. Upper 161 may comprise a battery assembly 163 in a heel region. Battery assembly 163 may include a battery and related power control electronics, the operation of which is described below. The bottom of upper 161 is open. Midsole 100 is placed through the open bottom of upper 161 and until top surface 103 contacts a bottom surface of the last. After placement of midsole 100, a bottom edge 162 of upper 161 extends beyond midsole 100.

In FIG. 5B, edges 162 are pulled inward over bottom surface 105, and portions of upper 161 adjacent edges 162 are bonded to portions of bottom surface 105.

In FIG. 5C, an additional sole structure 164 is attached by bonding a top of additional sole structure 164 to exposed portions of bottom surface 105 and/or to portions of upper 161 previously bonded to bottom surface 105. Additional sole structure 164 may comprise an outsole, an additional midsole, a cleat plate, and/or other conventional sole structures. A pocket in additional sole structure 164 receives controller 110. Prior to attachment of additional sole structure 164, wires from a battery pack 163 may be attached to controller 110.

FIGS. 5A through 5C merely show one example of how midsole 100 may be incorporated into an article of footwear. As but one example, an upper may include a lasting element that is bonded to a separate sole structure, and midsole 100 may be placed into the upper above the lasting element.

A midsole such as midsole 100 may be further modified to provide additional resistance to forefoot region shear forces. For example, a top edge of fulcrum element 123 may be enlarged and rounded and rest within a corresponding groove formed in the bottom of top forefoot plate 122. Optionally, an additional fulcrum element could extend from the top of bottom forefoot plate 121 in a central rear region, through an additional aperture formed in the rear central region of main body 11, to the bottom of top forefoot plate 122. The top edge of that additional fulcrum element could similarly be enlarged and rounded and rest within a corresponding groove formed in the bottom of top forefoot plate 122. As another example, a fulcrum element could have a two piece structure similar to a hinge, with a bottom portion of the fulcrum element pivotally joined to a top portion of the fulcrum element, with the bottom and top portions of the fulcrum element respectively joined to bottom and top forefoot plates, and with the pivot axis aligned in a front-to-rear direction.

A midsole modified to provide additional resistance to forefoot shear forces may be incorporated into a shoe using techniques in addition to those described above. For example, an upper may include a separate lasting element to which a top surface of such a midsole may be attached. An additional sole structure may then be attached to that midsole after that midsole has been attached to that lasting element, with the sides of that midsole being exposed in the completed shoe.

Figure 6A:
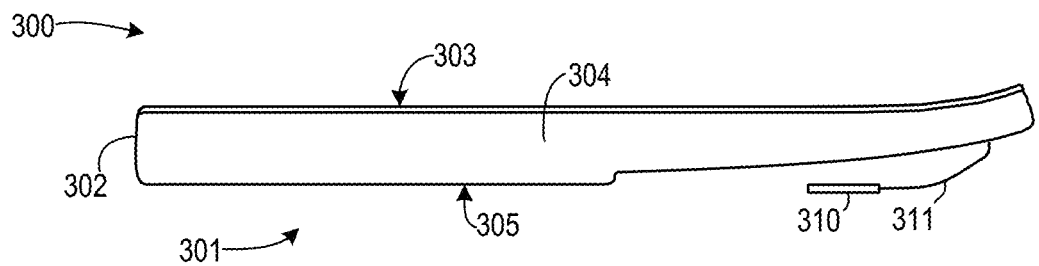
FIG. 6A is a medial side view of a midsole that incorporates an ER fluid housing of the type shown in FIGS. 2A-2E.
Figure 6B:
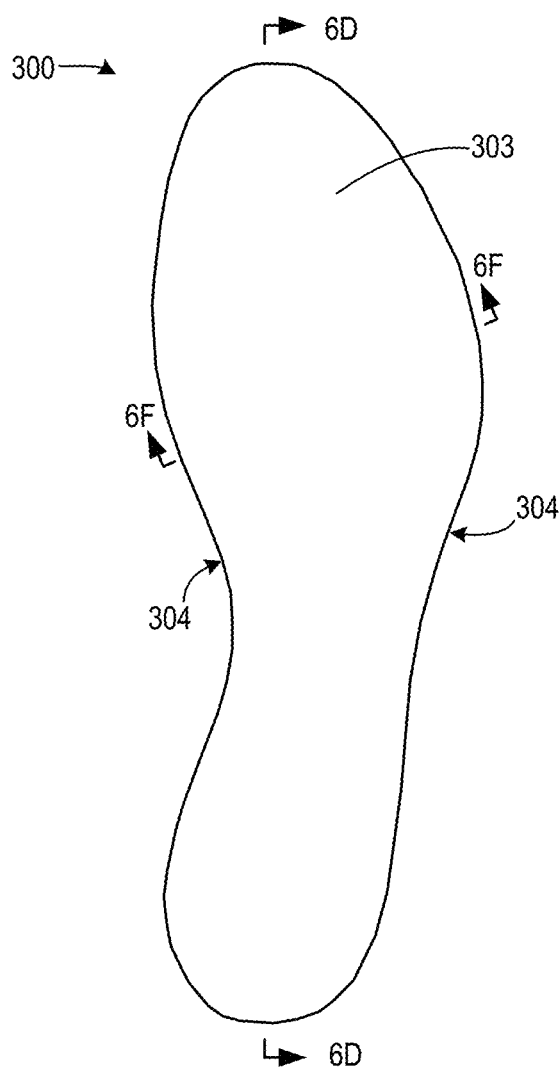
FIGS. 6B and 6C are respective top and bottom views of the midsole of FIG. 6A.
Figure 6C:
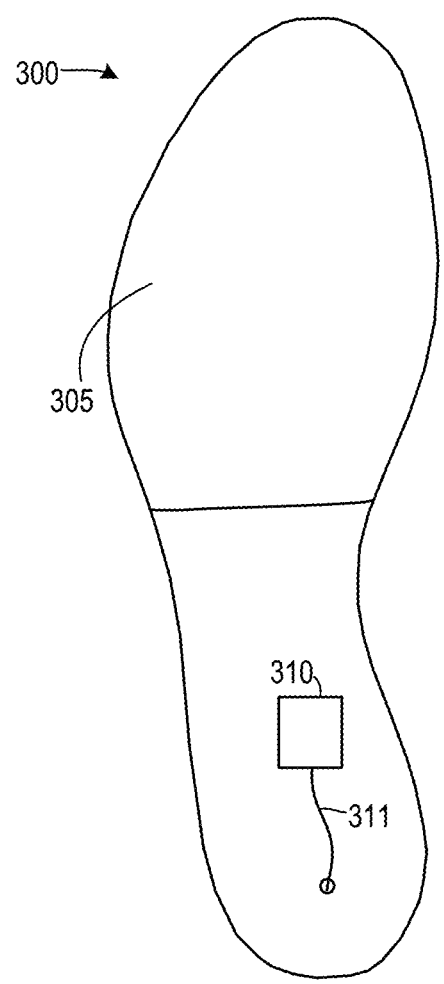

FIG. 6A is a medial side view of a midsole 300. Midsole 300 is a midsole for a right foot shoe of a pair that includes a left foot shoe. A midsole for the left foot shoe of that pair may be a mirror image of midsole 300. As explained in more detail below, midsole 300 includes an ER fluid housing 50. FIGS. 6B and 6C are respective top and bottom views of midsole 300. Midsole 300 comprises a midsole shell 302. Shell 302 comprises a top surface 303, a bottom surface 305, and a side surface 304 extending between top surface 303 and bottom surface 305. As seen in FIGS. 6B and 6C, and similar to sides surface 104 of midsole 100, side surface 304 has a shape corresponding to shape of a footwear sole structure in a plantar plane. After midsole 300 is incorporated into a shoe having an upper and a ground contacting surface, top surface 303 will face toward an interior region of the upper and bottom surface 305 will face toward the ground contacting surface. A controller 310 is connected to the ER fluid housing within midsole 300 by a wiring harness 311. Controller 310 contains electronics that may be used to control voltage applied to electrodes of the ER fluid housing. When incorporated into a shoe, controller 310 may be placed in an additional sole structure of the shoe.

Figure 6D:
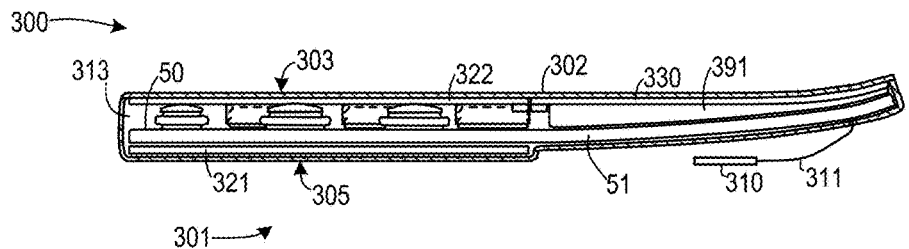
FIG. 6D is a partially cross-sectional medial side view of the midsole of FIG. 6A.
Figure 6E:
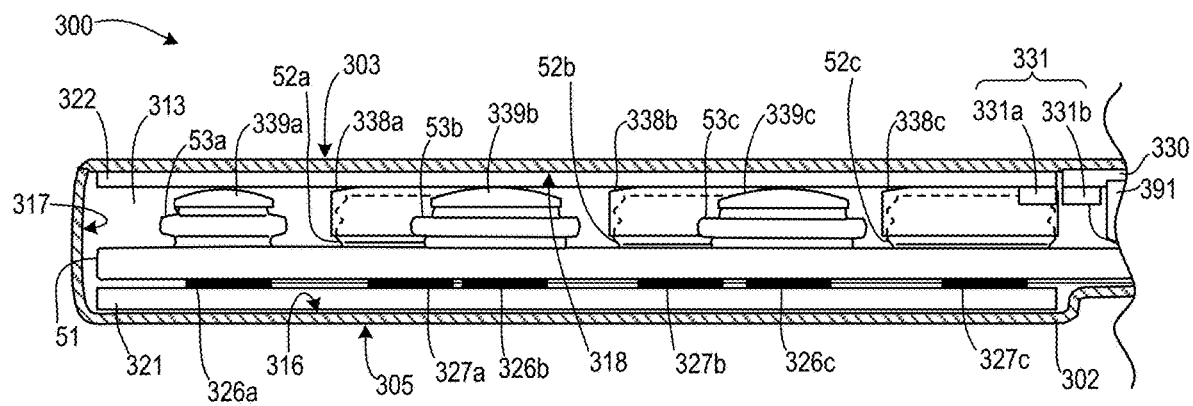
FIG. 6E is an enlargement of a portion of FIG. 6D.
Figure 6F:
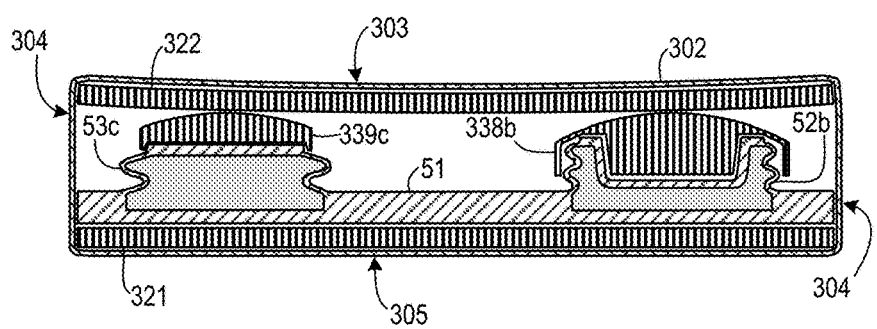
FIG. 6F is an area cross-sectional view of the midsole of FIG. 6A.

FIG. 6D is a partially cross-sectional medial side view of midsole 300. In FIG. 6D, shell 302 is shown in cross-section from the plane indicated in FIG. 6B, but other components of midsole 300 are not shown in cross-section. In other words, FIG. 6D is similar to a side view of midsole 300 with a medial side of shell 302 peeled away. FIG. 6E is an enlargement of a portion of FIG. 6D that includes forefoot region 301. FIG. 6F is an enlarged area cross-sectional view taken from the plane indicated in FIG. 6B.

ER fluid housing 50 is contained within shell 302 above bottom surface 305 and below top surface 303, and is surrounded by side surface 304. Shell 302 comprises an internal cavity 313. A base of shell 302 has an exterior surface that forms bottom surface 305 and an interior surface 316 that forms a bottom boundary of cavity 313. A rim of shell 302 has an exterior surface that forms side surface 304 and an interior surface 317 that forms a side wall of cavity 313. A cover of shell 302 has an exterior surface that forms top surface 303 and an interior surface 318 that forms a top boundary of cavity 313.

Also located within cavity 313 are bottom forefoot plate 321 and top forefoot plate 322. Plate 321, which may be formed from a relatively stiff polymer or polymer composite, helps to stiffen the forefoot region of midsole 300 and provide a stable base for the portion of ER fluid housing 50 that includes chambers 52 and 53. Plate 322 is generally aligned with plate 321 and may also be formed from a relatively stiff polymer or polymer composite. Top forefoot plate 322 provides a stable and relatively non-deformable region that is supported by chambers 52 and 53. Six FSRs 326a, 326b, 326c, 327a, 327b, and 32c7 are positioned between main body 51 and the top surface of plate 321. FSRs 326a through 326c are respectively positioned under chambers 53a through 53c. FSRs 327a through 327c are respectively positioned under chambers 52a through 52c.

Chambers 53a through 53c are respectively covered by support caps 339a through 339c. Chambers 52a through 52c are respectively covered by support caps 338a through 338c. Each of support caps 339 rests on top of its corresponding chamber 53. Each of support caps 338 includes a skirt that extends over a portion of the outer side wall 54 of its corresponding chamber 52 as well as a portion that extends downward into a depression in the top of its corresponding chamber 52. Support caps 338 and 339 may be formed from materials similar to those described above in connection with support caps 138 and 139. Support caps 338 and 339 may have rounded top surfaces that bear against the underside of top forefoot plate 322.

Midsole 300 also includes a rear plate 330 which extends rearward of top forefoot plate 322. Rear plate 330 extends to a heel region of midsole 300. As shown in FIG. 6D, an additional spacer element 391 may fill space between the underside of plate 330 and the top surface of main body 51. Examples of materials from which spacer element 391 may be formed include, without limitation compressed EVA (ethylene vinyl acetate) foam. Also and/or alternatively, the underside of plate 330 extend downward to eliminate space between the bottom of plate 330 and the top of main body 51.

When midsole 300 is used after incorporation into a shoe, and as described in more detail below, top forefoot plate 322 rotates relative to rear plate 330 as ER fluid is transferred between chambers 52 and 53. A magnetic rotational sensor 331 includes a front portion 331a secured to top forefoot plate 322 and a rear portion 331b secured to rear plate 330. A signal output from sensor 331 is indicative of a magnitude of relative rotational angle between plates 322 and 330. As discussed in more detail below, the signals from sensor 331 are received and used by controller 310 to determine a voltage to set across electrodes 62 and 63 in ER fluid housing 50. Wiring harness 311 includes wires connected to rear portion 331b of sensor 331, to FSRs 326 and 327, and to leads, not shown, that emanate from main body 51 and provide electrical connections to electrodes 62 and 63. Wiring harness 311 extends from cavity 313 to the exterior of midsole 300 through an opening 335 (shown in FIGS. 7A and 7B) in shell 302.

Shell 302 may be formed from materials like those described above for shell 102. A main portion of shell 302 that comprises the bottom and rim may be molded as one piece, and the cover of shell 302 molded as a separate piece. After all components have been placed into the main portion of shell 302, the cover of shell 302 may be bonded to an upper edge of the main portion using RF welding, chemical adhesive, or other process.

Figure 7C:
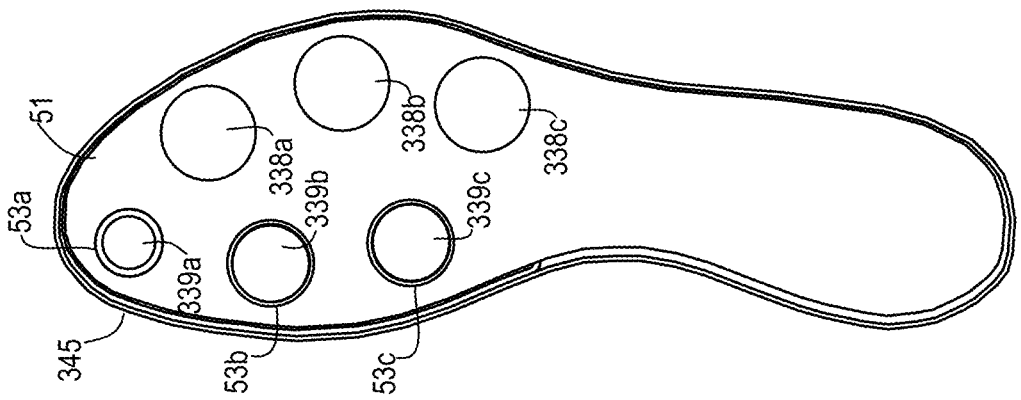
FIGS. 7A through 7F show assembly of the midsole of FIG. 7A.
Figure 7B:
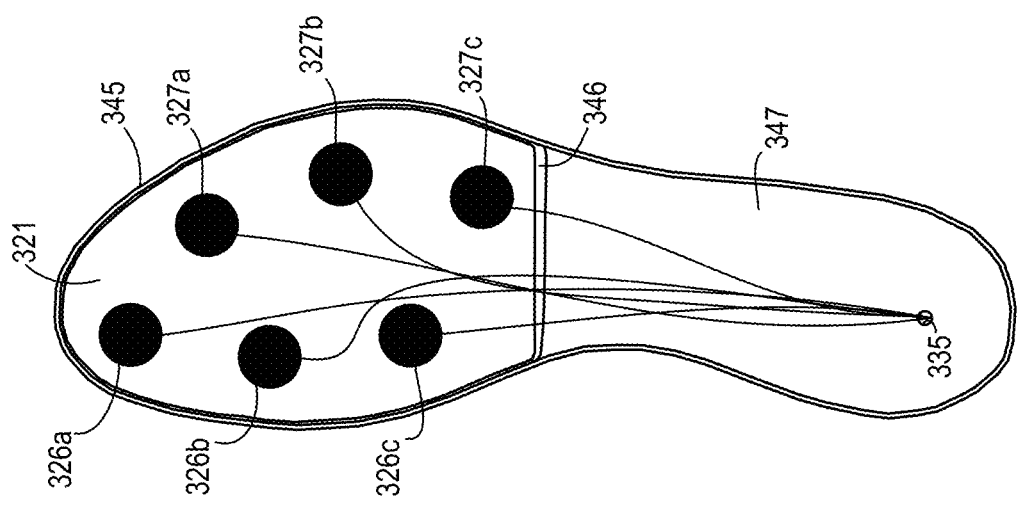
Figure 7A:
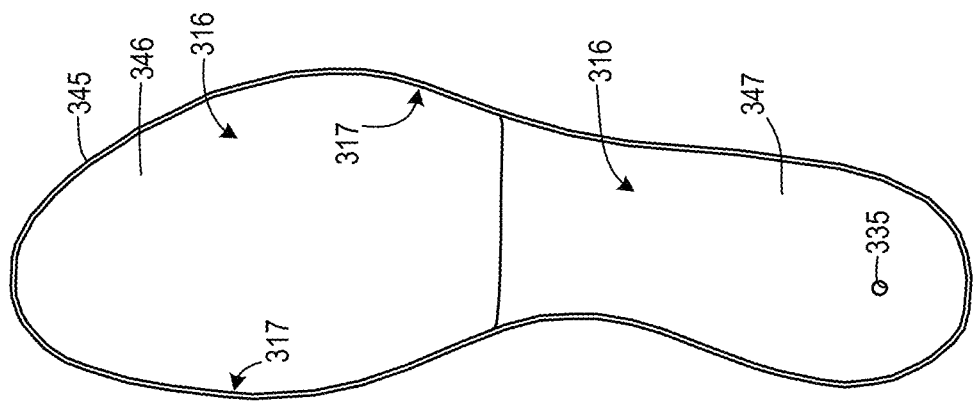

FIGS. 7A through 7F show assembly of midsole 300. FIG. 7A is a top view of a main portion 345 of shell 302. Interior surface 316 of the shell 302 bottom, and interior surface 317 of the shell 302 rim, define a forefoot pocket 346 and a midfoot/heel pocket 347 in main portion 345. Interior surfaces 316 and 317 will also define bottom and side boundaries of cavity 313 in an assembled midsole 300.

In FIG. 7B, bottom forefoot plate 321 has been placed in pocket 346. The bottom side of plate 321 may be adhesively bonded to a portion of interior surface 316 within pocket 346. FSRs 326 and 327 have been glued into place on the top side of plate 321. Wires from FSRs 326 and 327 have been routed through opening 335.

In FIG. 7C, ER fluid housing 500 has been put into place over top forefoot plate 321 and FSRs 326 and 327. Portions of the bottom of main body 51 may be adhesively bonded to portions of the top of plate 321. Wires attached to electrode leads (not shown) on the underside of main body 51 in the heel region are routed through opening 335. Support caps 338 and support caps 339 are put onto chambers 52 and 53. Support caps 338 and 339 may be at least partially secured to chamber 52 and 53 using adhesive.

Figure 7F:
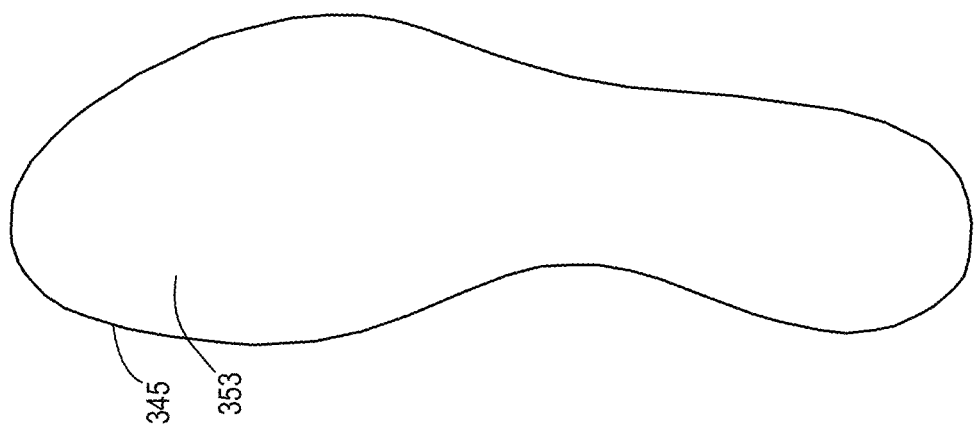
Figure 7E:
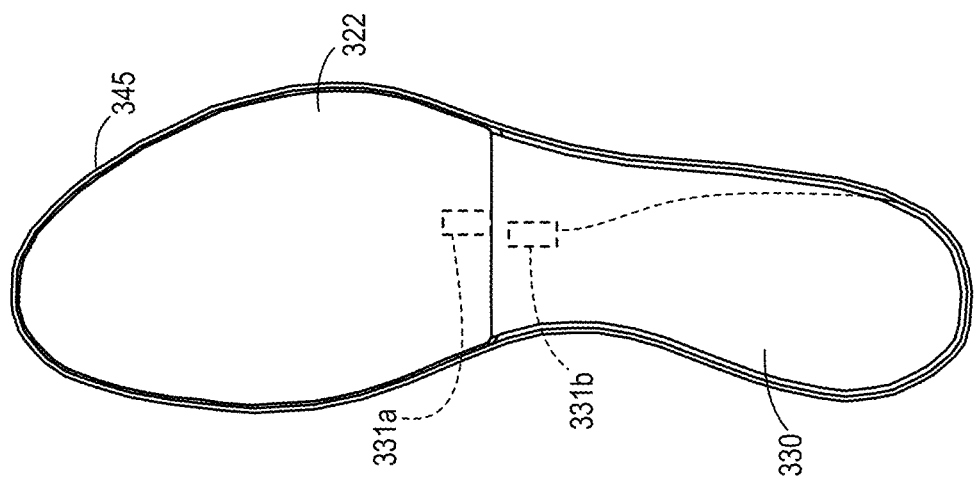
Figure 7D:
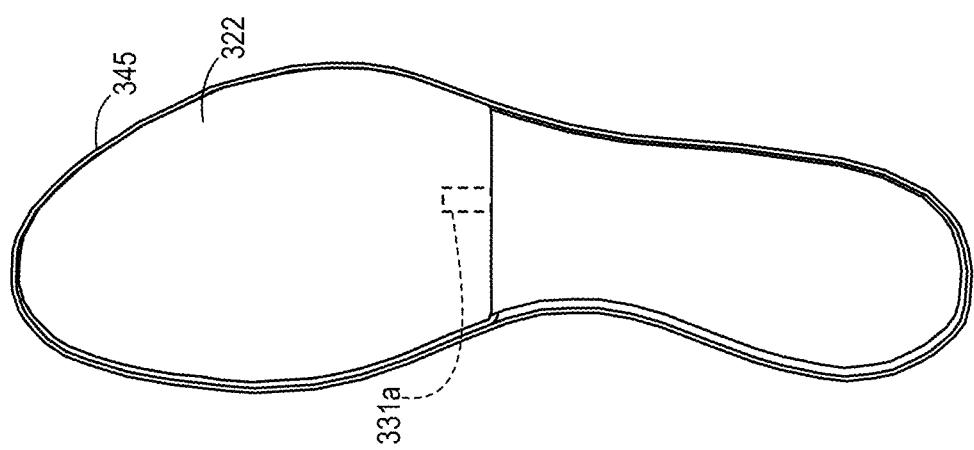

In FIG. 7D, top forefoot plate 322 has been put into place over the forefoot portion of ER fluid housing 50.

In FIG. 7E, rear plate 330 is put into place in pocket 347. While putting plate 330 into place, a wire from magnetic sensor component 331b is routed under the heel region of main body 51 and through opening 135.

In FIG. 7F, a cover 353 is placed of top forefoot plate 322 and rear plate 330. At least portions of the top of plate 322 and/or at least portions of the top of plate 330 may be adhesively bonded to the bottom of cover 353. The periphery of cover 353 is bonded to an upper edge of main portion 345 at or near a top of the shell 302 rim. Wires passed through opening 335 during assembly may be connected to controller 310 and bundled into harness 311.

Midsole 300 may be incorporated into a shoe using, e.g., methods like those described above in connection with midsole 100 and FIGS. 5A through 5C. Midsole 300 could also be placed inside an upper above a lasting element.

Figure 8:
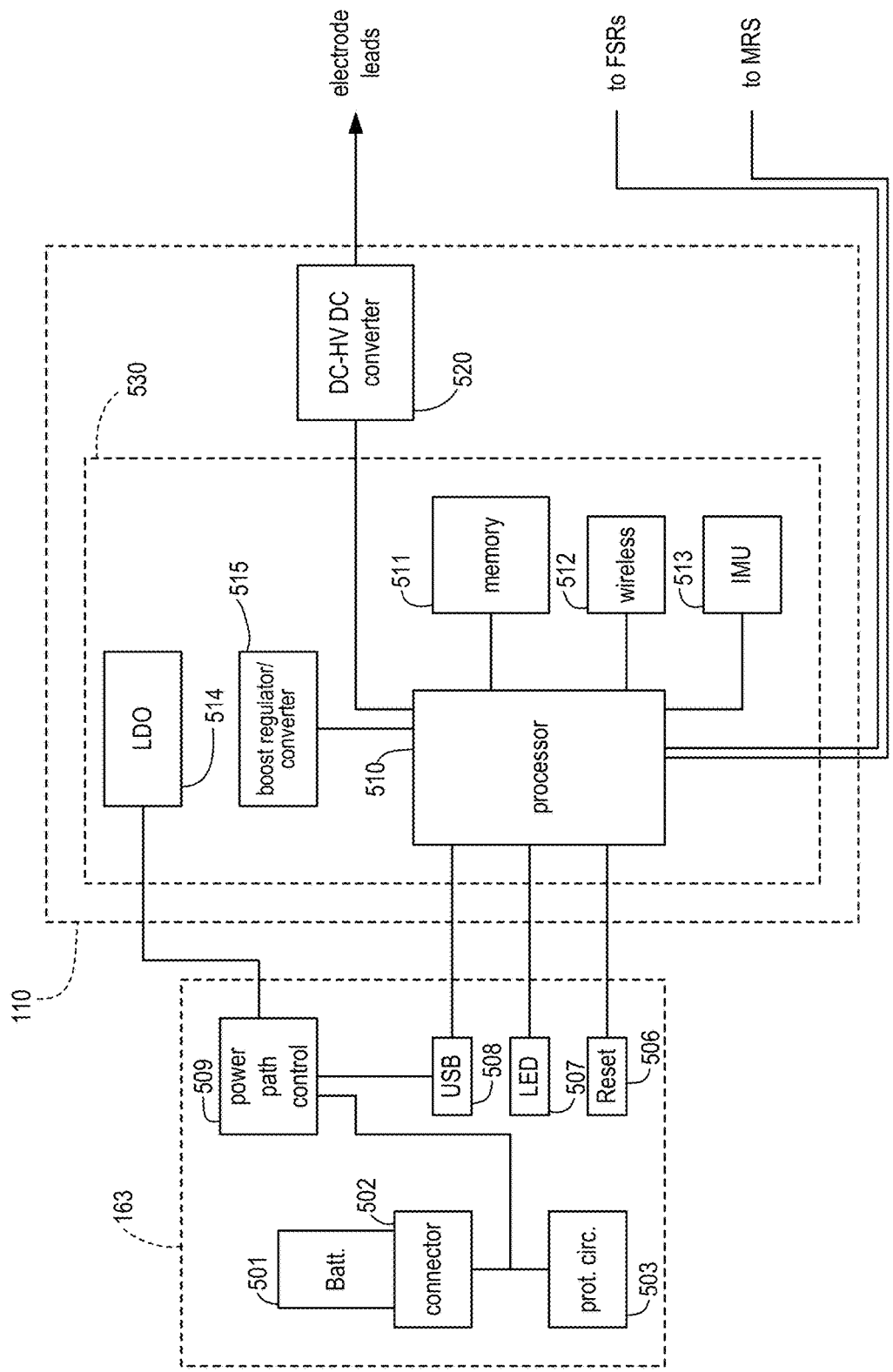
FIG. 8 is a block diagram showing electrical system components of the midsole of FIG. 3A and the battery pack shown in FIGS. 5A-5C.

FIG. 8 is a block diagram showing electrical system components of midsole 110 and battery pack 163. Individual lines to or from blocks in FIG. 8 represent signal (e.g., data and/or power) flow paths and are not necessarily intended to represent individual conductors. Battery pack 163 includes a rechargeable lithium ion battery 501, a battery connector 502, and a lithium ion battery protection IC (integrated circuit) 503. Protection IC 503 detects abnormal charging and discharging conditions, controls charging of battery 501, and performs other conventional battery protection circuit operations. Battery pack 163 also includes a USB (universal serial bus) port 508 for communication with controller 110 and for charging battery 501. A power path control unit 509 controls whether power is supplied to controller 110 from USB port 508 or from battery 501. An ON/OFF (O/O) button 506 activates or deactivates controller 110 and battery pack 163. An LED (light emitting diode) 507 indicates whether the electrical system is ON or OFF. The above-described individual elements of battery pack 163 may be conventional and commercially available components that are combined and used in the novel and inventive ways described herein.

Controller 110 includes the components housed on a PCB 530, as well as a DC-to-high-voltage-DC converter 520.

Converter 520 converts a low voltage DC electrical signal into a high voltage (e.g., 5000V) DC signal that is applied to electrodes within housing 10. The components of PCB 530 and converter 520 may be included on a single PCB, or may be packaged in some other manner. Controller 110 includes a processor 510, a memory 511, an inertial measurement unit (IMU) 513, and a low energy wireless communication module 512 (e.g., a BLUETOOTH communication module). Memory 511 stores instructions that may be executed by processor 510 and may store other data. Processor 510 executes instructions stored by memory 511 and/or stored in processor 510, which execution results in controller 110 performing operations such as are described herein. As used herein, instructions may include hard-coded instructions and/or programmable instructions.

IMU 513 may include a gyroscope and an accelerometer and/or a magnetometer. Data output by IMU 513 may be used by processor 510 to detect changes in orientation and motion of a shoe into which midsole 100 has been incorporated, and thus of a foot wearing that shoe. Processor 510 may use such information to determine when an incline of a portion of a sole structure of that shoe should change. Wireless communication module 512 may include an ASIC (application specific integrated circuit) and be used to communicate programming and other instructions to processor 510, as well as to download data that may be stored by memory 511 or processor 510.

Controller 110 includes a low-dropout voltage regulator (LDO) 514 and a boost regulator/converter 515. LDO 514 receives power from battery pack 163 and outputs a constant voltage to processor 510, memory 511, wireless communication module 512, and IMU 513. Boost regulator/converter 515 boosts a voltage from battery pack 163 to a level (e.g., 5 volts) that provides an acceptable input voltage to converter 520. Converter 520 then increases that voltage to a much higher level (e.g., 5000 volts) and supplies that high voltage across electrodes within ER fluid housing 10. Boost regulator/converter 515 and converter 520 are enabled and disabled by signals from processor 510. Controller 110 further receives signals from FSRs 126 and 127, as well as from component 131b of magnetic rotational sensor (MRS) 131. Based on signals from FSRs 126 and 127, processor 510 determines whether forces from a wearer foot on chambers 14 and 15 are creating a pressure within chamber 14 that is higher than a pressure within chamber 15, or vice versa. Based on signals from MRS 131, processor 510 determines whether the rotation of top forefoot plate 122 relative to rear plate 130 is at a desired value.

The above-described individual elements of controller 110 may be conventional and commercially available components that are combined and used in the novel and inventive ways described herein. Moreover, controller 110 is physically configured, by instructions stored in memory 511 and/or processor 510, to perform the herein described novel and inventive operations in connection with controlling transfer of fluid between chambers 15 and 14 so as to adjust the rotational angle of top forefoot plate 122 relative to rear plate 130.

Controller 310 of midsole 300 may be substantially similar to controller 110 and may be combined with a battery pack such as battery pack 163 in the same manner as is described above for controller 110. In controller 310, leads from a DC-HV DC converter similar to converter 520 are connected to electrode leads of housing 50. A processor of controller 510 is connected to FSRs 326 and 327 and to component 331b of MRS 331. Controller 310 is physically configured, by instructions stored in a memory similar to memory 511 and/or in a processor similar to processor 510, to perform the herein described novel and inventive operations in connection with controlling transfer of fluid between chambers 52 and 53 so as to adjust the rotational angle of top forefoot plate 322 relative to rear plate 330.

Figure 9A:
FIG. 9A shows a value for relative rotational angle α of zero degrees for the midsole of FIG. 3A.
Figure 9B:
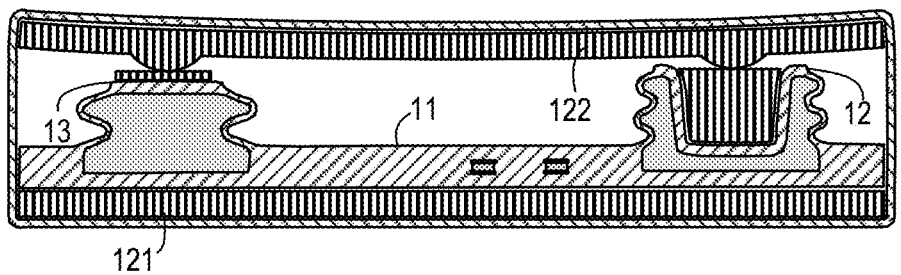
FIG. 9B shows an area cross-sectional view of the midsole of FIG. 3A, through the plane indicated in FIG. 3B, corresponding to a relative rotational angle α of zero degrees.
Figure 9C:
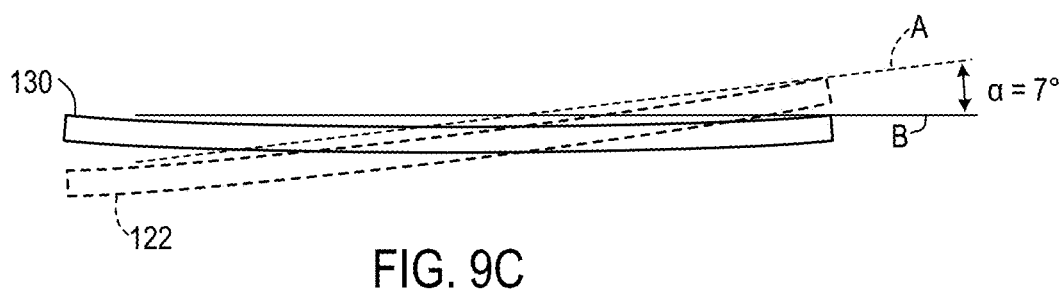
FIG. 9C shows a value for relative rotational angle α of seven degrees for the midsole of FIG. 3A.
Figure 9D:
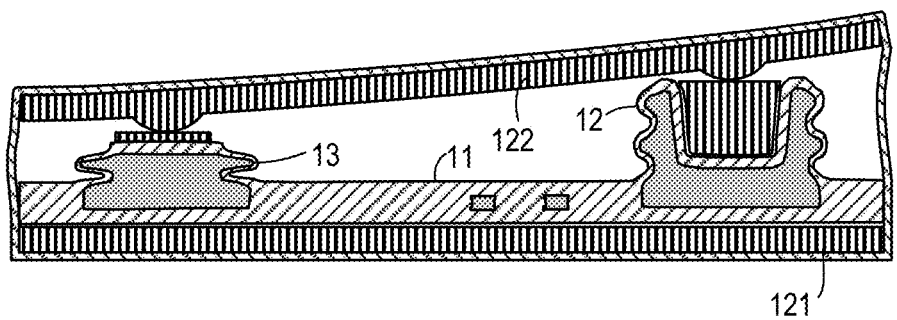
FIG. 9D shows an area cross-sectional view of the midsole of FIG. 3A, through the plane indicated in FIG. 3B, corresponding to a relative rotational angle α of seven degrees.
Figure 9E:
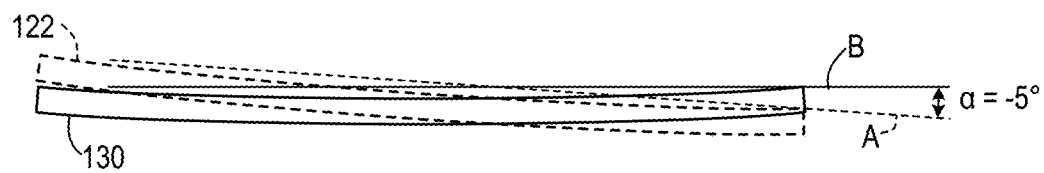
FIG. 9E shows a negative value for relative rotational angle α for the midsole of FIG. 3A.

A relative rotation angle may be defined in various ways. As one example, a relative rotation angle α between a top forefoot plate and a rear plate may be defined as an angle, in a plantar plane, between two lines located near an interface between the top forefoot plate and the rear plate. Those lines are shown in FIGS. 9A and 9C. One line extends from the medial edge of top forefoot plate 122 to the lateral edge of top forefoot plate 122 at the rear-most edge of top forefoot plate 122. Another line extends from the medial edge of top rear plate 130 to the lateral edge of rear plate 130 at the front-most edge of rear plate 130. In FIG. 9A, relative rotation angle α has a value, measured on the lateral side, of zero degrees. FIG. 9B shows an area cross-sectional view of midsole 100, through the plane indicated in FIG. 3B for FIG. 3F, when α=0°. In FIG. 9C, relative rotation angle α has a value of seven degrees. FIG. 9D shows an area cross-sectional view of midsole 100, through the plane indicated in FIG. 3B for FIG. 3F, when α=7°. A relative rotation angle α may be further defined such that positive values correspond to configurations in which the top lateral edge of top forefoot plate 122, at the interface between plates 122 and 130, is above the top lateral edge of rear plate 130 at the interface between plates 122 and 130. Negative values may correspond to configurations, such as that shown in FIG. 9E, in which the top lateral edge of top forefoot plate 122 (at the interface between plates 122 and 130) is below the top lateral edge of rear plate 130 (at the interface between plates 122 and 130).

Figure 10A:
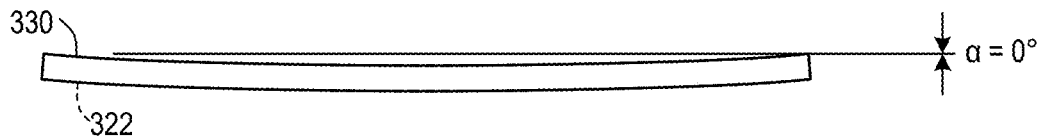
FIG. 10A shows a value for relative rotational angle α of zero degrees for the midsole of FIG. 6A.
Figure 10B:
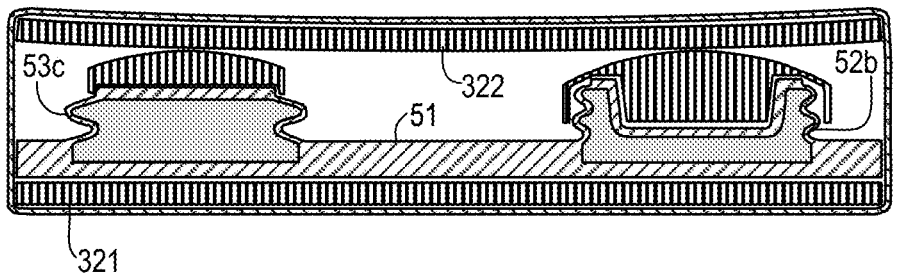
FIG. 10B shows an area cross-sectional view of the midsole of FIG. 6A, through the plane indicated in FIG. 6B, corresponding to a relative rotational angle α of zero degrees.
Figure 10C:
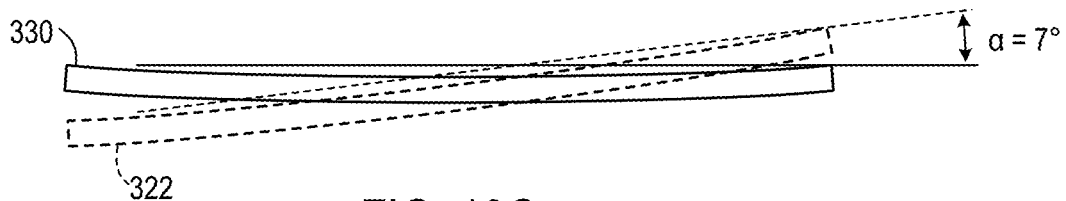
FIG. 10C shows a value for relative rotational angle α of seven degrees for the midsole of FIG. 6A.
Figure 10D:
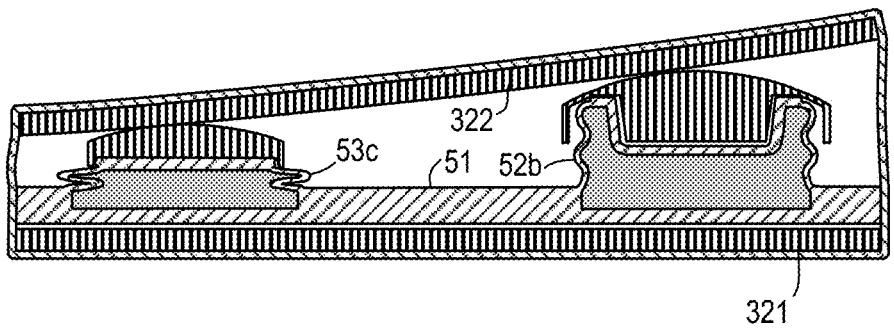
FIG. 10D shows an area cross-sectional view of the midsole of FIG. 6A, through the plane indicated in FIG. 6B, corresponding to a relative rotational angle α of seven degrees.

FIG. 10A shows a value for relative rotational angle α of zero degrees for midsole 300. FIG. 10B shows an area cross-sectional view of midsole 300, through the plane indicated in FIG. 6B for FIG. 6F, when α=0°. FIG. 10C shows a value for relative rotational angle α of seven degrees for midsole 300. FIG. 10D shows an area cross-sectional view of midsole 300, through the plane indicated in FIG. 6B for FIG. 6F, when α=7°.

Figure 11A:
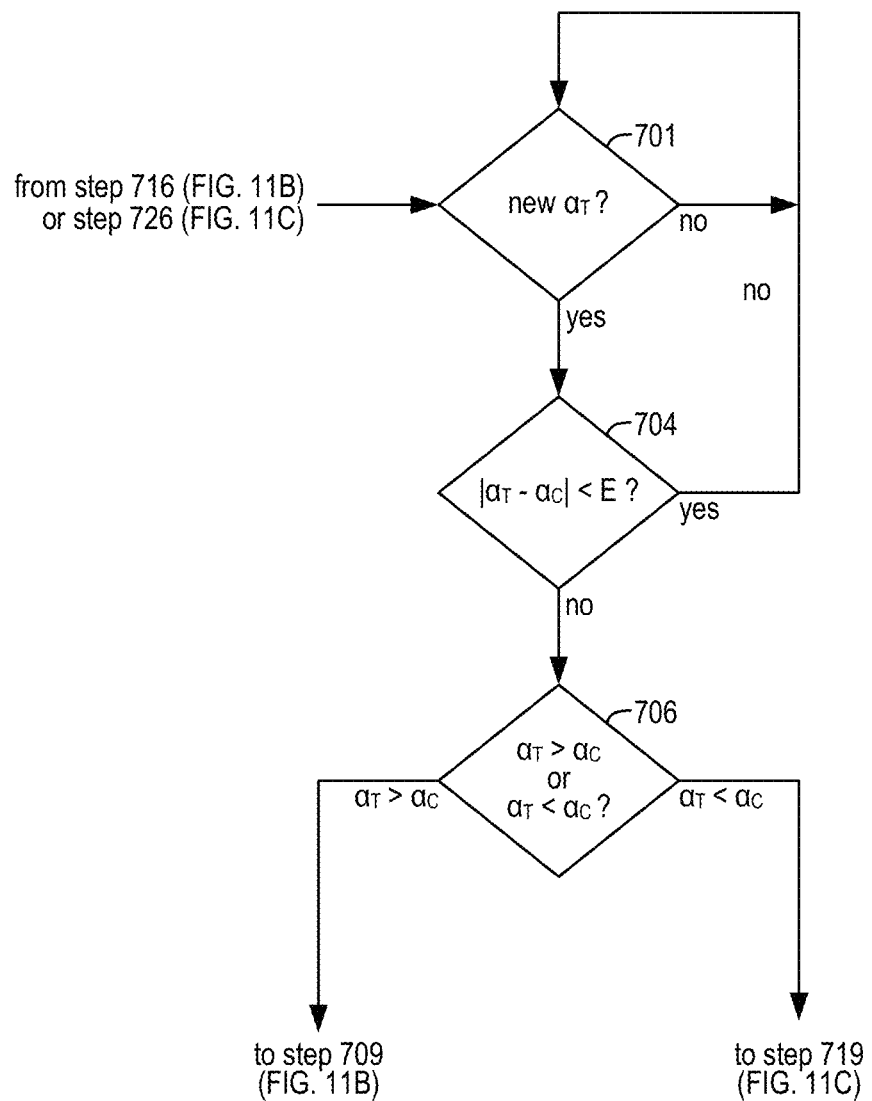
FIGS. 11A through 11C are flow charts showing operations performed by a controller of the midsole of FIG. 3A.
Figure 11B:
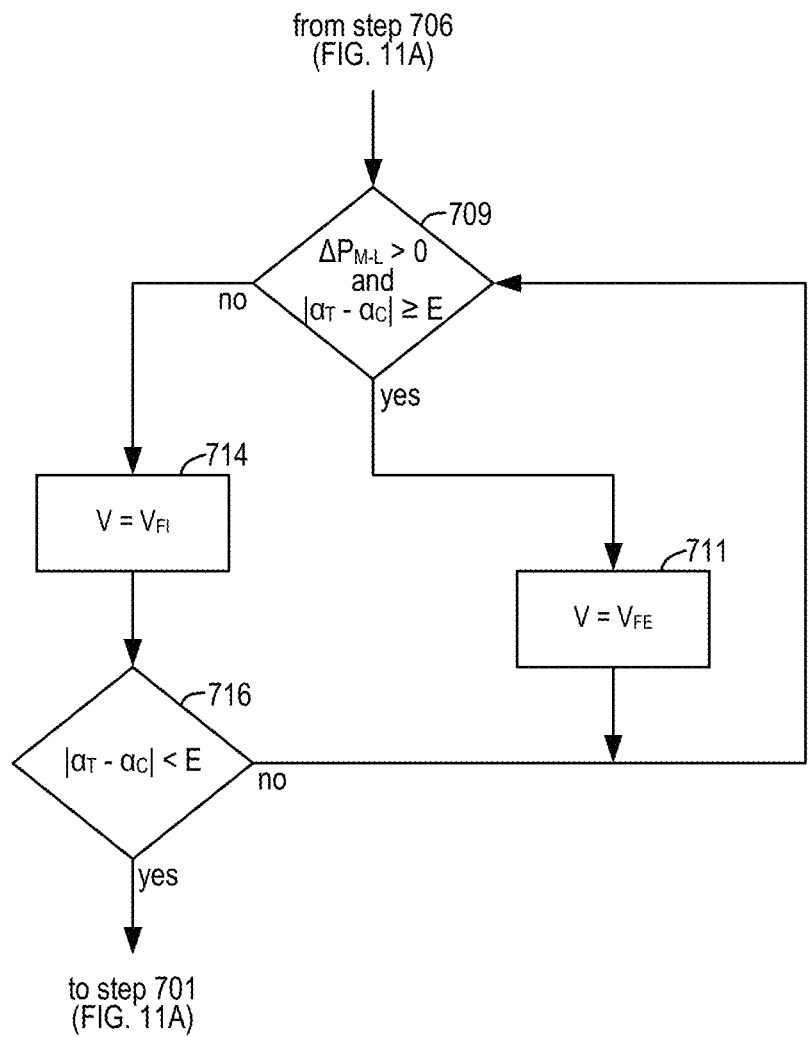
Figure 11C:
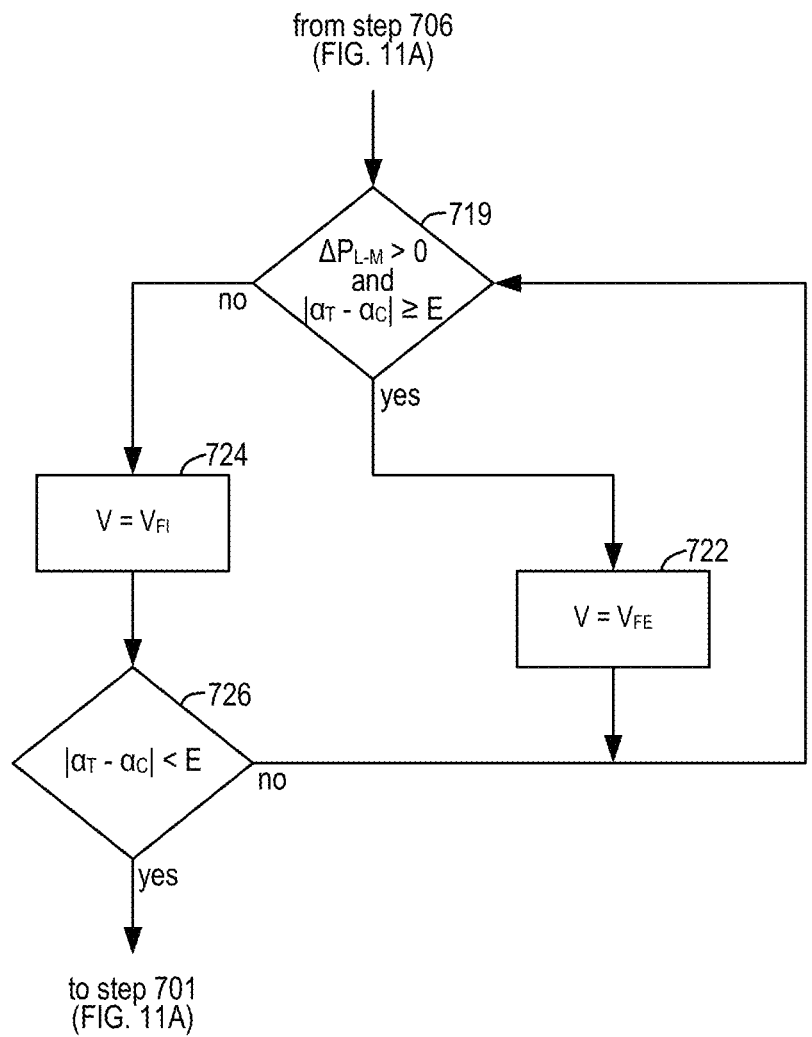

FIGS. 11A-11C are flow charts showing an example of operations that may be performed by controller 110 when a wearer of a shoe incorporating midsole 100 is running. In step 701, controller 110 determines if there is a new target value ($α_T$) for the relative rotational angle α. Controller 110 may calculate or receive a new target value $α_T$ upon determining that the shoe is in a location where increasing forefoot inclination may be desirable (e.g., in a bend of a track) or upon determining that the shoe is in a location where decreasing forefoot inclination may be desirable (e.g., in straight portion of a track). Controller 110 may make a determination of shoe location based on a count of steps taken by the shoe wearer (e.g., using data from IMU 513), based on GPS data, based on receiving a radio signal initiated by the shoe wearer or a third party (e.g., using a transmitter in a smart phone or other device to communicate with wireless communication module 512), or in some other manner. If there is no new $α_T$, controller 110 repeats step 701.

If there is a new $α_T$, controller 110 proceeds to step 704 and determines if the magnitude of the difference between a current value ($α_C$) for the relative rotational angle α and $α_T$ is less than an error value E. Error value E may be a variable value (e.g., a percentage of $α_T$), may be a constant value (e.g., 0.5°), or may be another value. Controller 110 determines $\alpha_C$ from one or more signals received from magnetic rotational sensor 131.

If the magnitude of the difference between $\alpha_T$ and $\alpha_C$ is less than E, controller 110 returns to step 701. Otherwise, controller 110 proceeds to step 706. In step 706, controller 110 determines whether $\alpha_T$ is greater than $\alpha_C$, or whether $\alpha_T$ is less than $\alpha_C$. If $\alpha_T$ is greater than $\alpha_C$, controller 110 proceeds to step 709 (FIG. 11B). In step 709, controller 110 determines if two conditions are satisfied. First, controller 110 determines if a value of $\Delta P_{M-L}$ is greater than 0. The value $\Delta P_{M-L}$ represents a difference between the pressure in medial side chamber 13 and the pressure in lateral side chamber 12. If the pressure in medial side chamber 13 is higher than the pressure in lateral side chamber 12, then ER fluid will flow from chamber 13 to chamber 12 if the voltage across electrodes 22 and 23 is set to a flow-enabling level ($V_{FE}$). Controller 110 determines pressures in chambers 12 and 13, which are generated by downward force of a wearer foot, based on one or more signals from FSRs 127 and 126.

The second condition determined by controller 110 in step 709 is whether the magnitude of the difference between $\alpha_T$ and $\alpha_C$ is greater than or equal to E. If both conditions in step 709 are satisfied, i.e., if $\Delta P_{M-L}>0$ and if $|\alpha_T-\alpha_C|\geq E$, controller 110 proceeds to step 711 and sets the voltage V across electrodes 22 and 23 at $V_{FE}$. Controller 110 then returns to step 709.

If either condition is not satisfied in step 709, i.e., if $\Delta P_{M-L}\leq 0$ or if $|\alpha_T-\alpha_C|<E$, controller 110 proceeds to step 714. In step 714, controller 714 sets the voltage across electrodes 22 and 23 at a flow-inhibiting level $V_{FI}$. Controller 110 then proceeds to step 716 and determines if $|\alpha_T-\alpha_C|<E$, which would indicate that the angle $\alpha$ has reached its desired value. If $|\alpha_T-\alpha_C|<E$, controller 110 returns to step 701 (FIG. 11A). Otherwise, controller 110 returns to step 709.

If controller 110 determines in step 706 (FIG. 11A) that $\alpha_T$ is less than $\alpha_C$, controller 110 proceeds to step 719 (FIG. 11C). In step 719, controller 110 determines if two conditions are satisfied. First, controller 110 determines if a value of $\Delta P_{L-M}$ is greater than 0. The value $\Delta P_{L-M}$ represents a difference between the pressure in lateral side chamber 12 and the pressure in medial side chamber 13. If the pressure in lateral side chamber 12 is higher than the pressure in medial side chamber 13, then ER fluid will flow from chamber 12 to chamber 13 if the voltage across electrodes 22 and 23 is set to $V_{FE}$.

The second condition determined by controller 110 in step 719 is whether the magnitude of the difference between $\alpha_T$ and $\alpha_C$ is greater than or equal to E. If both conditions in step 719 are satisfied, i.e., if $\Delta P_{L-M}>0$ and if $|\alpha_T-\alpha_C|\geq E$, controller 110 proceeds to step 722 and sets the voltage V across electrodes 22 and 23 at $V_{FE}$. Controller 110 then returns to step 719.

If either condition is not satisfied in step 719, i.e., if $\Delta P_{L-M}\leq 0$ or if $|\alpha_T-\alpha_C|<E$, controller 110 proceeds to step 724. In step 724, controller 714 sets the voltage across electrodes 22 and 23 at $V_{FI}$. Controller 110 then proceeds to step 726 and determines if $|\alpha_T-\alpha_C|<E$. If $|\alpha_T-\alpha_C|<E$, controller 110 returns to step 701 (FIG. 11A). Otherwise, controller 110 returns to step 719.

Controller 310 may perform operations similar to those of FIGS. 11A-11C in connection with running by a wearer of a shoe that incorporates midsole 300. In such a shoe, controller 310 would determine values for $\alpha_C$ based on one or more signals from magnetic rotation sensor 331 and would determine values for $\Delta P_{M-L}$ and $\Delta P_{L-M}$ based on one or more signals from FSRs 338 and 339. A sum of values from the medial FSRs 326a, 326b, and 326c may be used as a value of the medial pressure $P_M$ and a sum of values from the lateral FSRs 327a, 327b, and 327c may be used as the value of the lateral pressure $P_L$.

One example of a sensor that may be used for magnetic rotation sensor 131 or magnetic rotation sensor 331 is a low power magnetic rotary position sensor available from Austria Micro Systems AG under part number AS5055A.

Figure 12A:
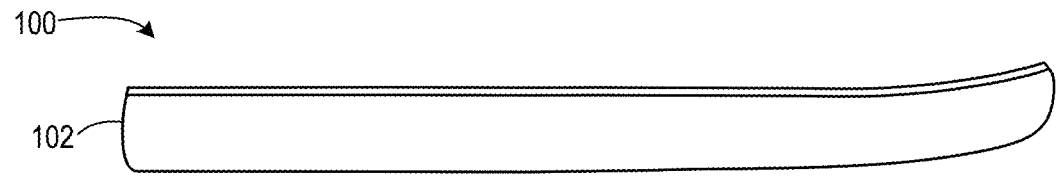
FIG. 12A is a medial side view of another midsole that incorporates an ER fluid housing of the type shown in FIGS. 1A-1D.
Figure 12B:
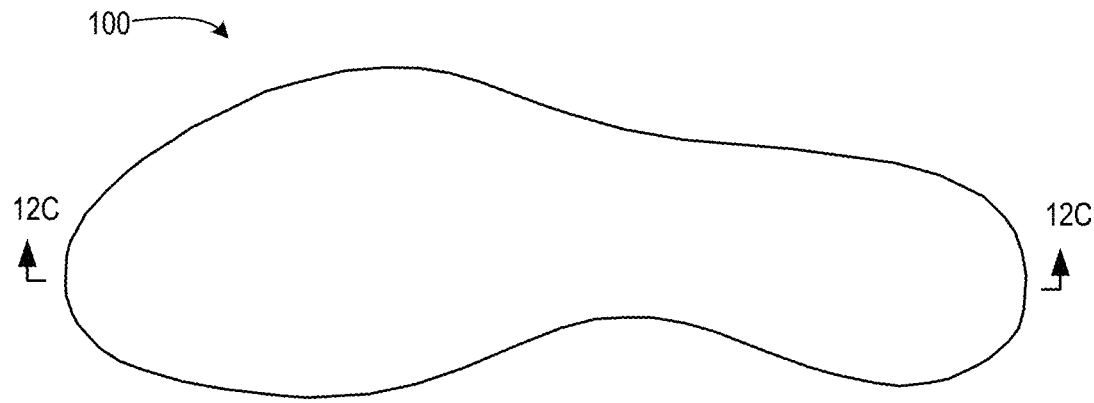
FIG. 12B is a top view of the midsole of FIG. 12A.
Figure 12C:
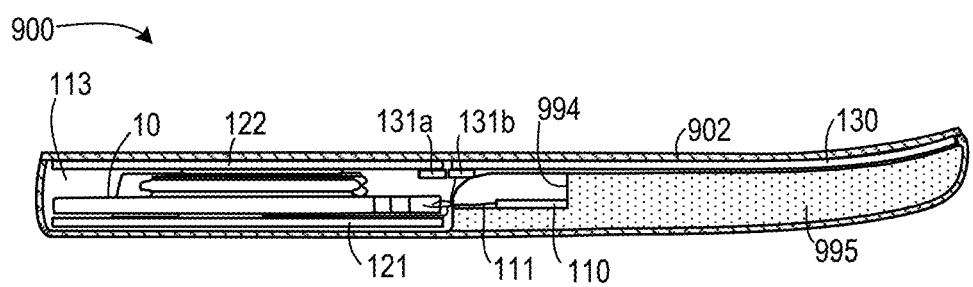
FIG. 12C is a partially cross-sectional medial side view of the midsole of FIG. 12A.

Some midsoles having an incorporated ER fluid housing may include one or more cushioning elements formed from EVA foam or from other type of foam. One example was described above in connection with midsole 300, where element 391 may be formed from foam. Another example is shown in FIGS. 12A-12C. FIG. 12A is a medial side view of a midsole 900. FIG. 12B is a top view of midsole 900. FIG. 12C is a partially cross-sectional medial side view of midsole 900 in which, similar to FIGS. 3D and 6D, a medial side of a shell 902 has been removed. Elements of midsole 900 that are the same as elements of midsole 100 have the same reference numbers as are used in connection midsole 100. In FIG. 12C, an EVA foam element 995 is also shown in cross-section. Foam element 995 may rest under rear plate 330 and include a pocket 994 to receive controller 110.

Figure 13:
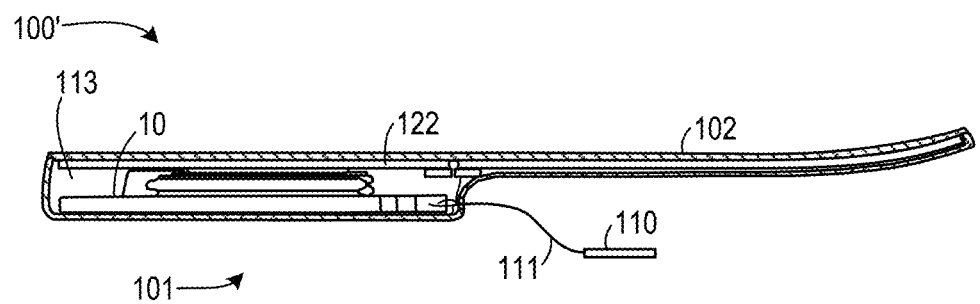
FIGS. 13 and 14 are partially cross-sectional medial side views of additional midsoles.
Figure 14:
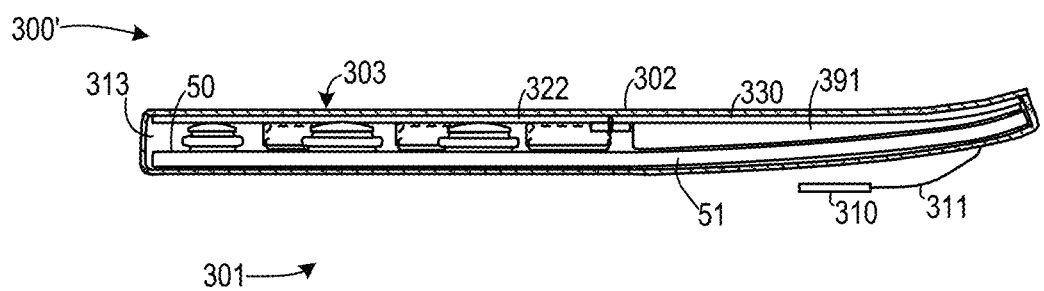

A midsole having an incorporated ER fluid housing may lack a lower forefoot plate. Such a midsole may be configured for incorporation into an additional sole structure that has a stiffened forefoot region and/or that may include a separate plate placed between a bottom surface of the midsole and the forefoot region of the additional sole structure. FSRs may be affixed to a bottom surface of a midsole cavity or to a bottom surface of and ER fluid housing during assembly. FIG. 13 is a partially cross-sectional medial side view of a sole structure 100' that lacks a lower forefoot plate, but that is otherwise the same as midsole 100. FIG. 14 is a partially cross-sectional medial side view of a sole structure 300' that lacks a lower forefoot plate, but that is otherwise the same as midsole 300.

A midsole having an incorporated ER fluid housing may lack a rear plate and/or may not extend the full length of shoe when installed. In some such midsoles, a magnetic sensor component (similar to components 131a and 331a) may be exposed at the rear edge of the midsole and may interface, when the midsole is installed into a shoe, with another magnetic sensor component (similar to components 131b and 331b) attached to an additional sole structure component of the shoe.

A midsole having an incorporated ER fluid housing may lack a magnetic rotation sensor. A midsole having an incorporated ER fluid housing may have a rotation sensor of a type other than a magnetic rotation sensor.

A top forefoot plate may be embedded in a midsole having an incorporated ER fluid housing, with some or all of the top surface of the top forefoot plate exposed and forming a portion of the midsole top surface. A bottom forefoot plate may be embedded in a midsole having an incorporated ER fluid housing, with some or all of the bottom surface of the bottom forefoot plate exposed and forming a portion of the midsole bottom surface. A rear plate may be embedded in a midsole having an incorporated ER fluid housing, with some or all of the top surface of the rear plate exposed and forming a portion of the midsole top surface.

The foregoing has been presented for purposes of illustration and description. The foregoing is not intended to be exhaustive or to limit embodiments of the present invention to the precise form disclosed, and modifications and variations are possible in light of the above teachings or may be acquired from practice of various embodiments. The examples discussed herein were chosen and described in order to explain the principles and the nature of various embodiments and their practical application to enable one skilled in the art to utilize the present invention in various embodiments and with various modifications as are suited to the particular use contemplated. Any and all combinations, subcombinations and permutations of features from herein-described examples are the within the scope of the invention.

The invention claimed is:

1. An article comprising:
a sole structure, the sole structure comprising:
a midsole, the midsole comprising a top surface, a bottom surface, and a side surface extending between the top surface and bottom surface, the midsole having a forefoot region, a midfoot region, and a heel region;
the midsole further comprising a shell extending through the forefoot region, the midfoot region, and the heel region of the midsole,
the shell comprises a base, a rim extending upward from the base, and a forefoot region cavity defined at least in part by an interior surface of the base and by at least a portion of an interior surface of the rim,
the rim has a shape adapted to correspond to at least a forefoot section of an article of footwear,
a bottom surface of the base forms the bottom surface of the midsole;
the midsole further comprising an electrorheological (ER) fluid housing and a forefoot plate, and wherein
the ER fluid housing is located between the top surface and the bottom surface only in the forefoot region cavity of the shell of the midsole,
the ER fluid housing comprises a main body and multiple chambers,
each of the chambers contains an electrorheological fluid and is configured to change outward extension from the main body in correspondence to change in volume of the electrorheological fluid within the respective chamber, such that the changed outward extension results in a change in height of the respective chamber,
the main body comprises a transfer channel permitting flow between the chambers,
the transfer channel comprises opposing first and second electrodes extending along an interior of a portion of the transfer channel configured to generate a field, and
the forefoot plate is positioned over the chambers;
a magnetic rotation sensor configured to measure an angle of rotation of the forefoot plate relative to a magnet attached to another part of the sole structure.

2. The article of claim 1, further comprising a rear plate, wherein the magnetic rotation sensor is configured to measure an angle of rotation of the forefoot plate relative to the rear plate.

3. The article of claim 1, further comprising a controller including a processor and a memory comprising instructions stored on said memory, wherein the stored instructions are executable by the processor to cause the processor to perform steps that include setting a voltage across the electrodes based at least in part on one or more signals received from the rotation sensor.

4. The article of claim 3, wherein the stored instructions for setting a voltage across the electrodes are further based at least in part on one or more signals received from the rotation sensor and on one or more signals corresponding to pressures within the chambers.

5. The article of claim 1, further comprising a controller including a processor and a memory comprising instructions stored on said memory, wherein the stored instructions are executable by the processor to cause the processor to perform steps that include
(a) receiving an indication that a relative angle between the forefoot plate should have a target value,
(b) determining, based on one or more signals from the rotation sensor, that the relative angle has a value that differs from the target value by more than an error value,
(c) in response to the determining that the relative angle has a value that differs from the target value by more than the error value, setting a voltage across the first and second electrodes at a flow-enabling level permitting flow of the electrorheological fluid through the transfer channel,
(d) determining, subsequent to (c) and based at least in part on one or more additional signals from the rotation sensor, that the relative angle has a value that differs from the target value by less than the error value, and
(e) in response to the determining that the relative angle has a value that differs from the target value by less than the error value, setting a voltage across the first and second electrodes at a flow-inhibiting level blocking flow of the electrorheological fluid through the transfer channel.

6. The article of claim 1, further comprising a second forefoot plate, wherein the second forefoot plate is positioned under the main body.

7. The article of claim 1, wherein the shell comprises a cover located above the forefoot plate.

8. The article of claim 1, wherein the main body extends beyond the forefoot region of the midsole.

9. The article of claim 1, wherein the midsole is not incorporated into an article of footwear.

10. The article of claim 1, wherein the midsole is incorporated into an article of footwear having an upper and an additional sole structure.

11. A method comprising:
receiving an article according to claim 1;
attaching the article to an upper; and
attaching an additional sole structure to the article.

12. A method comprising:
receiving an article according to claim 1; and
incorporating the article into an article of footwear.

13. A method comprising:
receiving an article according to claim 1; and
combining the article with an upper and an additional sole structure into an article of footwear.

* * * * *